US009641676B1

(12) United States Patent
Mandic et al.

(10) Patent No.: US 9,641,676 B1
(45) Date of Patent: May 2, 2017

(54) CALL CENTER AUDIO REDACTION PROCESS AND SYSTEM

(71) Applicant: Authority Software LLC, Tamarac, FL (US)

(72) Inventors: Louis Mandic, Tamarac, FL (US); Natalie Perez, Tamarac, FL (US)

(73) Assignee: Authority Software LLC, Tamarac, FL (US)

( * ) Notice: Subject to any disclaimer, the term of this patent is extended or adjusted under 35 U.S.C. 154(b) by 0 days.

(21) Appl. No.: 15/238,826

(22) Filed: Aug. 17, 2016

(51) Int. Cl.
| | |
|---|---|
| H04M 3/00 | (2006.01) |
| H04M 5/00 | (2006.01) |
| H04M 3/42 | (2006.01) |
| H04M 3/51 | (2006.01) |
| G06F 21/80 | (2013.01) |
| H04L 29/08 | (2006.01) |

(52) U.S. Cl.
CPC ........ H04M 3/42221 (2013.01); G06F 21/80 (2013.01); H04M 3/5175 (2013.01); *G06F 2221/2143* (2013.01); *H04L 67/1097* (2013.01); *H04M 2203/301* (2013.01); *H04M 2203/303* (2013.01); *H04M 2203/558* (2013.01); *H04M 2203/60* (2013.01)

(58) Field of Classification Search
CPC ........... H04M 3/42221; H04M 3/5175; H04M 2203/301; H04M 2203/303; H04M 2203/558; H04M 2203/60; G06F 21/80; G06F 2221/2143; G04L 67/1097

USPC .............................. 379/265.07, 266.01, 309
See application file for complete search history.

(56) References Cited

U.S. PATENT DOCUMENTS

| | | | | |
|---|---|---|---|---|
| 2010/0241844 | A1* | 9/2010 | Hussain | .............. G06F 21/6218 |
| | | | | 713/150 |
| 2013/0266127 | A1* | 10/2013 | Schachter | ............... G10L 25/48 |
| | | | | 379/88.01 |

\* cited by examiner

*Primary Examiner* — Quynh Nguyen
(74) *Attorney, Agent, or Firm* — Robert C. Kain, Jr.

(57) ABSTRACT

The redaction process/system operates on temporarily captured/saved audio file during an agent-customer-call center (CC) call. Voice-based audio data is captured and processed by monitoring data input from CC-agent into a defined data field (field in a CC-agent-presented form). The redact process generates a start-record time based upon initial data input into the field and further generates an end-of-recording ("EOR") time for the field. The audio file is filtered and segments are permanently saved audio data (A-data) bounded by the start-record and EOR times. Thereafter, all stored audio data is deleted (preferably crypto-shredded) except the saved A-data to substantially eliminate retrieval of initially stored audio data. An IVR process can be used to trigger record ON/OFF instructions. Audio file segments can be trimmed with precursive and successive time periods to move the start and end times of the audio segments. System Operator sets time-trim periods.

27 Claims, 16 Drawing Sheets

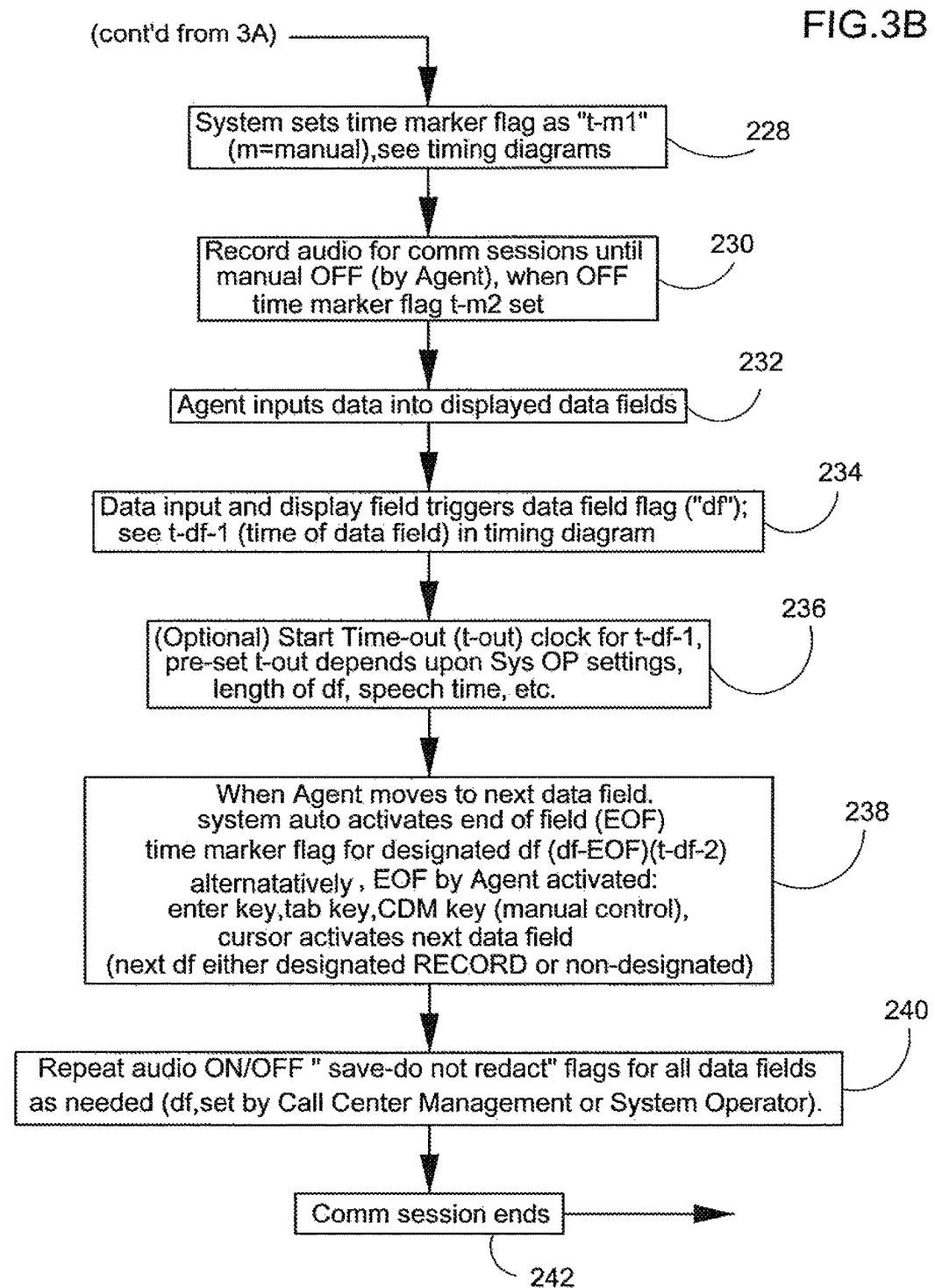

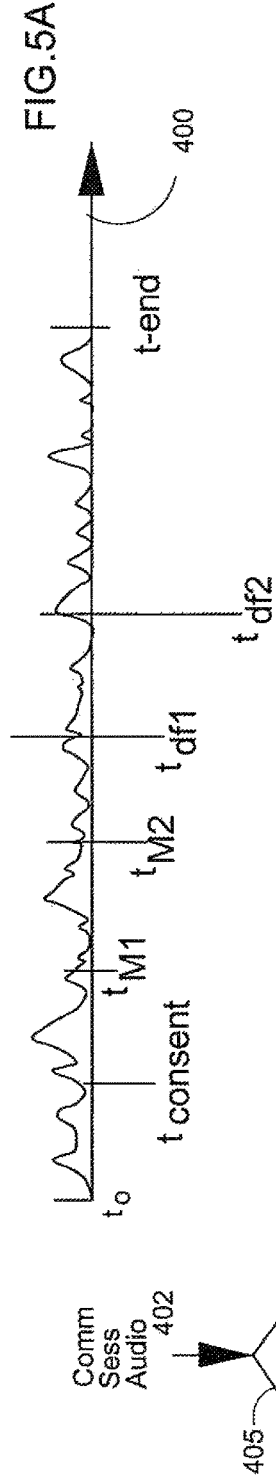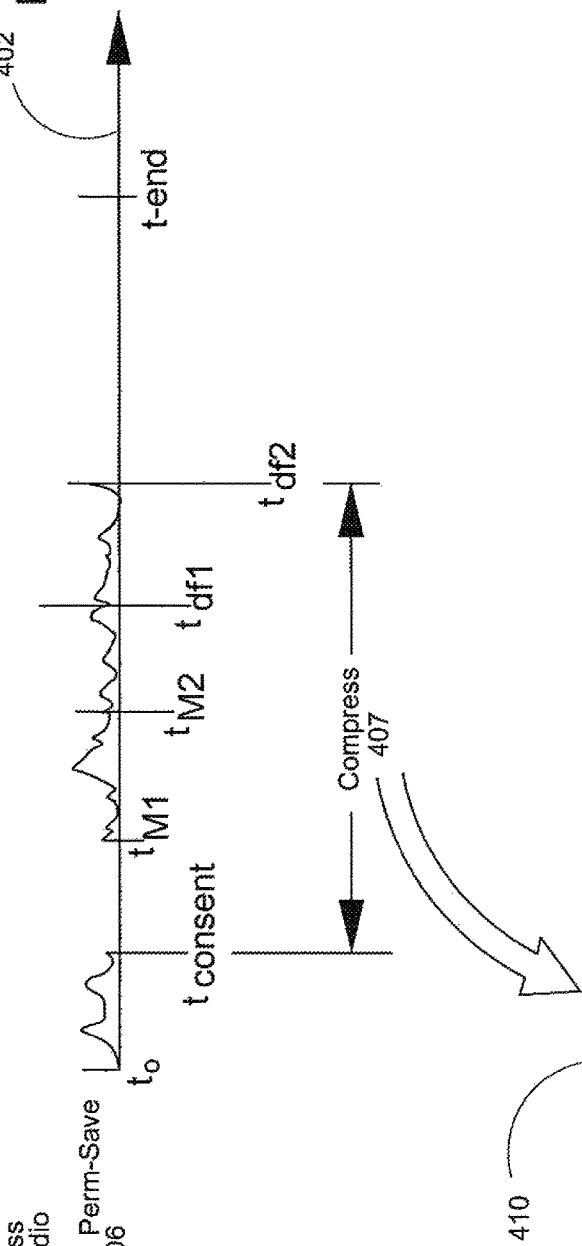

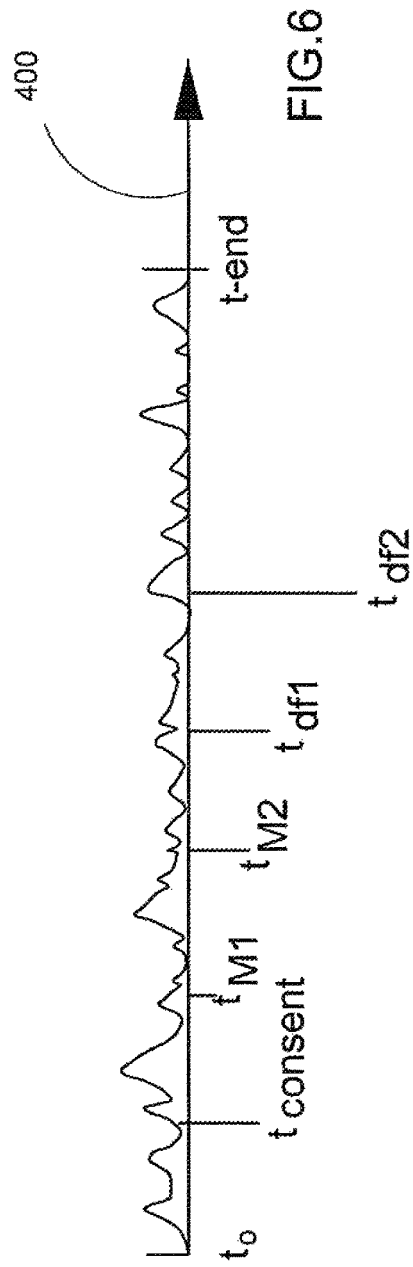
FIG. 6
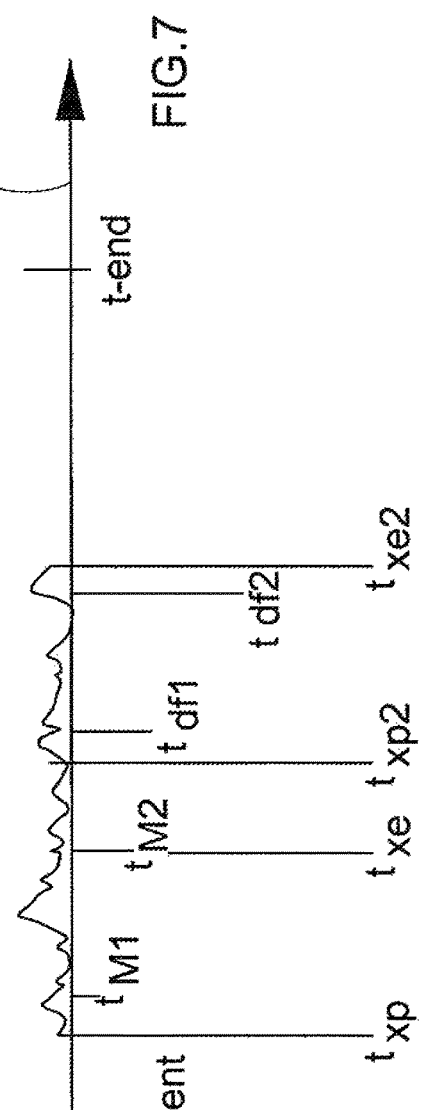
FIG. 7
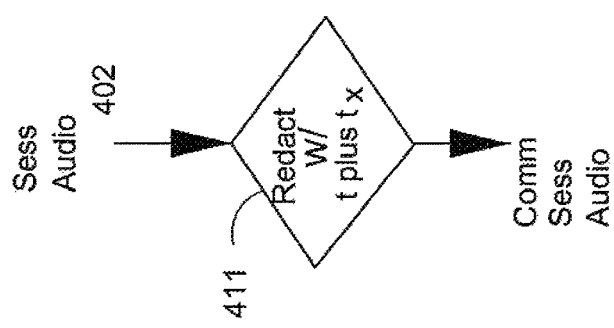

CALL CENTER AUDIO REDACTION PROCESS AND SYSTEM

The present invention relates to a redaction process and a redaction system for deleting either unnecessary data from an audio recording or redacting sensitive personal identifying information (PII), medical information or other audio representations of high security data or confidential data obtained during a customer—agent communications session with a call center. Only confirmatory PII, medical data etc. is permanently saved. Trimming of such confirmatory PII, medical data or high security data prior to permanent storage for confirmatory purposes is also provided. PCI compliance can be achieved with the invention. Over longer time frames (3 months, 12 months), the initial permanently saved data may be further processed to delete more PII, medical etc. data to limit liability for a data breach.

BACKGROUND OF THE INVENTION

Call centers provide customers with needed information for new products and services, provide responses to customer inquiries regarding purchased goods and services, handle customer complaints and billing inquiries and provide bill payment services to businesses.

In the 1960s, early call centers primarily provided telephone answering services and message forwarding services between a caller, seeking to contact the call center customer (typically a business customer), and the call center business customer wishing to be informed of calls directed to him or her. From that humble beginning, call centers expanded their operations to provide a wider range of services, acting as a customer interface between a customer and a business vendor who sells goods or services to the public at large. However, the prime function of the call center involved the oral communication between the call center agent and the call center customer (as compared to the call center business customer). Even in those early days, call centers would record the agent-customer audio data for the business customer.

Beyond telephone answering services, vendors of goods and services saw an opportunity to use call centers as a mechanism to sell and promote their goods and services. Also vendors saw an opportunity to use call centers to handle customer complaints and provide useful information regarding the goods and services to customers seeking information from those vendors. This service is generally referred to as CRM or customer relationship management services.

The next evolution of call centers involved handling billing complaints from customers and, equally important, services prompting the customers to pay vendors and credit card service providers money owed by the customers (bill collection services).

In its expanded CRM role, call centers evolved from large buildings having large numbers of call center agents with the requisite telecommunication switching networks and phone systems into a more distributed computing environment where the bulk of data processing for incoming calls from customers are handled via the Internet by cloud computing and data storage services. Currently, some call centers have large physical facilities, other centers use distributed computer networks linking multiple agent centers, and other centers have agents which sign into a cloud-based call center processing server (as an example, each agent may interconnect with the cloud-based call center at the agent's home, all that is needed is a laptop computer (or tablet), a telecomm line and an audio speaker-microphone headset for the customer-agent call). Some call centers are independent operators and some businesses have in-house call center operations. Other businesses have small in-house call center operations and use independent call center entities to handle overflow or certain "campaigns". Examples of a campaign are: new product promotion and sales, product recall events, and credit remediation services due to a business data breach, among others.

Further, to improve the relationship between members of the public who were primarily impacted by call center operations (as compared with the businesses who hire and pay for call center services), the call center industry employs a concept that any person who contact the call center (inbound inquiry) or who is contacted by a call center agent (an outbound event) is a "call center customer." As used herein, the term "customer" refers to persons who contacts a call center or who are contacted by a call center, in contrast to the term "business" which hires or retains the services of a call center. Of course, businesses may hire a call center to contact other "business customers" but those contacted entities are called "call center customers" herein.

Earlier, call centers provided bill collection services to businesses. This involves collection of credit card, account data and potentially bank account data from customers. Account data is highly sensitive, confidential information. All call center campaigns relating to credit remediation services handle highly sensitive PII data and account data.

Later on, call centers were used to sell goods and services to the public. A typical example of an out-bound event involves a call center reaching out to members of the public to sell credit card affiliate services the credit card holders. Another example of the expanding role of call centers is to obtain information from a customer relating to life insurance products. In this example the member of the public applies for the insurance and makes an inquiry online (via the Internet) or completes a paper form and transmits it to the insurance company. This call center business customer launches a campaign wherein the call center agent will contact the prospective life insurance customer and obtain detailed medical information from the customer. This medical information is highly confidential. Therefore, PCI compliance can be achieved with these features.

The expansion of call center services to its business customers requires that the call center continually train call center agents regarding the information provided to call-center customers. Further in order to efficiently utilize call center agent time, agents are trained to handle a wide variety of consumer interactions both in connection with the sale or pitching of goods and services as well as the handling customer complaints, providing bill payment services and engaging in bill collection services. During the day, an agent may handle 4 or 5 different calls for different businesses. To train agents, call centers record the audio portion of the comm session between the agent and the customer. Managers review the stored audio tracks to quality purposes and to provide additional training for the agents.

To increase the efficiency and utilization of agent time, call centers employ databases or other data storage facilities (as used herein, the term "database" is broadly meant to cover any type of spreadsheet, database, data storage facility and data collection without regard to the type or manner of organization and without regard to whether the data storage facility or function is commonly called "a database"). These call-center databases are operated by call-center processors. Typically, the audio comm session data is stored in the database along with other common data such as agent name, date, customer name, profile, start time and end time of the comm session.

One example of call-center operations in connection with a billing inquiry from a customer, involves the customer calling a unique business-provided number which is tied via a telecomm network to the call center operation. An agent is initially assigned to the communications session (comm session) and the agent opens the comm session with a pre-formatted display screen related to the business. The preformatted display screen is a form stored in the database. The agent asks the customer his or her account number or credit card number. At other times the customer may have accessed the business provided telephone number and the interactive voice response on the phone line requests that the customer input via his or her account number via the telephone keypad or the orally announce the account number or credit card number over the line to the automated answering service. Thereafter, the comm session is opened with the agent and the customer account number is automatically displayed in the database form at a certain data field displayed to the agent. The agent sees the partly-filled database form on his or her computer terminal and more particularly the display monitor on the agent terminal (the terminal may be a desktop computer, a laptop, a tablet computer and, in some unique circumstances, a smart phone). Also, the database form presents the agent with questions that he or she will read to the customer. The term "form" is broadly used herein to refer to any preformatted presentation to the agent from the call center processor and the database, including split screen displays showing multiple Q&A form data and data input fields.

The customer oftentimes provides audible information to the agent and the agent either inputs this information via keyboard, keypad or mouse-cursor interactions. In sophisticated call-center operations, the call center will have interactive voice response (IVR) modules which will prepopulate data fields in the database and agent-provided form based upon customer responses to audio prompts. In response to these prefilled data fields, the agent may audibly confirm this information with the customer in order to ensure accuracy. This audio track is recorded as audio data for quality assurance purposes.

In certain CRM situations, a customer may be irate and this customer emotion has an impact on the call center agent's ability to provide assistance to the customer. In other situation, such as the outbound life insurance medical inquiry described above, the agent may request that the customer describe his or her medical conditions in great detail in order to provide sufficient information for the life insurance underwriter. This audio track is recorded for underwriting purposes. The data can be scrubbed for PCI compliance.

In order to improve customer satisfaction, improve the quality of CRM, enhance customer service delivered by call center agents, and to train agents to engage in ever more complex customer interactions, call centers typically record the audio communication during a comm session. Historically, call centers have always recorded audio tracks for their business customers.

Nearly every state has laws that require that the customer must give his or her consent to the audio recording of a telephone call. This portion of the comm session is recorded in the "consent" portion of the audio record and is typically permanently saved with the comm session record file in the call-center database.

However, the long-term storage by the call center of critical audio data such as PII data, medical history, confidential or secret information belonging to the customer is a burden on the center. This is true without regard to whether the center is in-house in a business or an independent operation. Laws and regulations now require multiple levels of security that must be employed by the call-center to ensure that the audio file containing PII, medical data or highly sensitive security information recorded during the comm session is handled with a reasonable degree of data security. Data breaches of databases with PII, medical data and highly sensitive confidential information are a matter of great concern. Governmental agencies actively pursue business that suffer these types of data breaches. Also, as the expense of data storage costs continually fall, businesses tend to keep data files longer, thereby increasing the risk of data breaches.

The burden on the call-center to maintain a high level data security for all audio records of every comm session between every agent and every customer is very high. If all these comm session audio files are delivered to the businesses (and thereafter deleted from the call center database), the business then bears the burden of data security. For this customer sensitive information (e.g., PII, medical, etc.), the comm session data and audio files should be kept in a highly encrypted form for a number of years. Given the fact that an agent may handle hundreds of customer comm sessions a day, secure data storage charges become expensive. Although a call center can reduce data storage charges and processing time charges for secure data storage, the overhead and burden on their data storage resources is significant. Transferring these audio data files to their business customers only passes the buck, the overhead and the burden to the business. The transfer does not solve the problem. Business customers face the same degree of regulations and oversight regarding secure storage of PII data and medical data and other highly secure personal data.

In order to solve the heavy burden imposed on call centers (both in data storage and in processing time costs) and the burden on call center business customers with respect to long-term data storage of the audio files, the present invention provides several automated redaction tools operative on these audio data files. With these automated redaction tools, audio files can be highly compressed by permanently saving only small segments of each comm session audio file. Also, automated redaction tools can trim the audio files such that only a small confirmatory audio segments are saved. For example during a comm session, if the customer audibly announces his or her credit card number as 12345678, the auto redaction trimming tool provided by this invention trims that audio file such that only the last four digits of the customer's credit card account number are permanently saved, that is, the audio file only has segment 5678. The same is true regarding audio recordings of Social Security numbers (SSN). The automatic redaction trimming tool saves just the last four digits of the customer's SSN, that is, 6789 from the SSN 123456789.

OBJECTS OF THE INVENTION

It is an object of the present invention to provide a redaction process and a redaction system for deleting either unnecessary data from an audio recording, redacting other portions of the audio file and saving confirmatory sensitive personal identifying information (PII), medical information or other audio representations of high security data or confidential data obtained during a customer—agent communications session with a call center.

It is a further object of the present invention to provide permanent saving of limited audio file segments (as part of the comm session record) and complete deletion and destruction of the entire audio data file for the comm session.

It is an additional object of the present invention to provide complete deletion and destruction of the entire audio data file with crypto deletion of the file and digital file location data on all audio data storage devices and all audio files in databases.

It is another object of the present invention to provide trimming of such PII, medical data or high security data prior to permanent storage of confirmatory portions for security and liability purposes and long term data storage. Trimming "silent periods" from the raw audio recordings is accomplished with trimming tools operative on "no audio volume" or "nominal audio volume" audio segments.

It is an additional object of the present invention to reduce the heavy burden imposed on call centers (both in data storage and in processing time cost (processing time used in connection with data encryption)) for secure long-term data storage of highly secure data and to reduce the similar burden placed on business customers by redacting only critical data needed by the call center or the business and by the otherwise permanent deletion of the entire audio data file.

It is another object of the present invention to provide automated redaction tools whereby the audio file segment can be highly compressed and permanently saved or stored using only small segments of each comm session audio file.

It is a further object of the present invention to provide automated trimming redaction tools to trim the audio file segments such that only small confirmatory audio segments are permanently saved.

It is an object of the present invention to provide a redaction process and automated redaction tools that can be preset, by the call center or the business (to permanently save only comm session audio data segments with confirmatory data (the last 4 SSN digits)) and redact processes and tools that can be re-set by the business to permanently save only comm session audio data segments needed by the business. In this manner, the complete or entire audio file is shared by the call center to the business and (a) the call center uses the redaction process and automated redaction tools with one set of redaction/saving/deletion parameters or commands and (b) the business uses the redaction process and automated redaction tools with another set of redaction/saving/deletion parameters or commands. Each operation is handling the audio files in a manner commensurate with the operation's data security protocols and liability responsibilities to the customer. The data security protocols being mean to protect against data breach and data theft events.

SUMMARY OF THE INVENTION

The present invention relates to a redaction process operating on a captured audio file and a call center ("CC") with a redactor for redacting data from the initially captured audio file. The redaction process is deployed in combination with a call center which has a CC processor and a CC database coupled to telecommunications networks. The Center handles calls between a plurality of customers and a plurality of CC agents. More particularly the redaction process operates on voice-based audio data in a unique communication session between a respective customer and a corresponding agent. The redaction process stores, at least on a temporary basis, the audio data captured during the comm session between the customer and the agent. The CC processor monitors data input from the agent when the agent inputs data into one or more predefined data fields. These predefined data fields are displayed to the agent by the CC processor and the data fields relate to CC database forms. The data input from the agent into the predefined data field is both monitored and processed by the CC processor.

A start-recording time marker is created by the CC processor as part of the redaction process and is based upon an initial data input by the agent into the designated data field. The process also generates and end-of-recording ("EOR") time marker for the redaction process. The process then filters the stored audio data and permanently saves audio data segments which are bounded by and fall within the start-record time marker and the EOR time marker. The process then deletes all stored audio data except the permanently stored or permanently saved audio data segments in a manner that substantially eliminates retrieval of the stored audio data, but not the saved audio segment data. Stated otherwise, the audio segments which are not redacted are permanently saved but the entire audio data record from the comm session is permanently deleted. Crypto shredding of the captured audio data is utilized. Otherwise, the entire audio data record (in contrast to the saved segments) is deleted and all data pointers or "data location" data for the entire audio data record is deleted from the CC processor memory and/or the CC database. Since the "database" is defined herein as any type of data storage, the entire audio data file is deleted and destroyed from the CC processor RAM and the CC database and all other data storage units and devices operated in conjunction with the CC processor. This "delete entire audio file" can be done hours, days or months after the redaction and permanent saving of the audio data segments.

The redaction process can operate in a cloud-based call center operation. In a cloud-base center, the CC database initially stores the audio data for the comm session. Herein this initial stored is called "temporary storage." The redaction process deletes all stored audio data in the CC database except for the permanently saved redacted audio data segments. In most situations the permanently saved audio data segments are stored with other comm session data such as, time of call, end time of call, agent and customer data (User Personal Profile or UPP data). This "delete entire audio file" can be done hours, days or months after the redaction and permanent saving of the audio data segments. Although the term "permanent" is used in connection with stored audio segments, the permanently stored audio segments can be re-redacted month later. The re-redaction further deletes PII, etc. that is no longer needed for liability purposes.

The redaction process can also be operated in a remote setting where the call center (the CC processor in the CC database) are remotely geographically disposed over the Internet telecommunications network from a redaction processor and redaction database. In a remote operation, the audio data is initially stored on a temporary basis in the CC database or in a temporary memory utilized by the CC processor (both data storage facilities broadly defined as being encompassed by the term "database" as used herein). The agent input into the predefined data field is monitored by the CC processor. The redaction process occurs geographically remotely away from the CC database and CC processor. This involves utilization of a redaction processor and a redaction database. These computer-based components are connected to the CC processor and CC database via a telecom network. The redaction processor and the redaction database accepts the temporarily stored audio data from the CC process and the CC database sent over the telecomm network. The redaction processor and redaction database filter the stored audio data file (the entire audio data file) and permanently save the non-redacted audio data segments in the redaction database along with comm session data for the respective customer—agent communication session. The remotely disposed redaction processor issues a delete-audio-file command to the CC processor which is an instruction to the CC processor to delete all stored audio data in a manner that substantially eliminates retrieval from the CC database. This CC deletion can be done well after the redaction and permanent saving of the audio data segments. The redact processor crypto shreds the entire audio file from its memory saving only audio segments.

The redaction process can also be integrated into the call center operation. In this situation, the CC processor generates the start-record time marker and the EOR time marker for the designated data field. This data field was subject to an initial data input by the agent. The CC processor then filters the temporarily stored audio data based upon the start-record time marker and the EOR time marker and permanently saves those audio data segments in the CC database. Thereafter, the CC processor deletes all stored audio data (the entire audio file) from the CC database except for the non-redacted saved audio data segments. Deletion by crypto shredding is sometimes utilized. However, deletion of the entire audio data file in a manner that substantially eliminates retrieval of the audio file is required. This "delete entire audio file" can be done hours, days or months after the redaction and permanent saving of the audio data segments.

Some automated redaction processes and tools permit the system operator to add a predetermined precursive time period to the start-record time marker. In this manner if the agent hears the customer audibly announce the customer's credit card number and the agent thereafter begins to input the credit card number into the designated data field displayed on the agent's terminal, the redaction process and system (a) first sets the start-record time marker at the time that the agent initially inputs the first few digits into the credit card data field and (b) thereafter the redaction process moves the time marker to an earlier predetermined precursive period of time. This is an anticipatory start-record time marker and is meant to capture the earlier audible announcement by the customer of his or her credit card number. The precursive period and the anticipatory start-record time marker enhance the permanent capture and storage of the credit card audio record. In this manner the filter operating on the temporarily stored audio data excerpts audio data at the anticipatory start record time marker and captures and permanently stores the audio record segment between that anticipatory time marker and the EOR time marker.

The EOR or end-of-recording time marker is established by the redaction process based upon several different conditions or events. The system operator (or the business having the redaction tools and processes) can set different EOR trigger events to stop the permanent recording function. One EOR condition may be a simple timeout period based upon the start record time marker or the anticipatory start record time marker. Another EOR time marker is generated when data input into the designated data field by the agent exceeds the data field limit. A further EOR marker is triggered when the agent moves the curser to another data field on the form. Another EOR time marker is manually generated by the agent by selecting the "stop recording" or OFF function button or selects a function key or command keystrokes on the agent's computer terminal device. Further, the redaction process may monitor an agent keyed input to generate the EOR such as by use of the enter key, the tab key, the page up, page down, an alpha keyed input when the agent has previously provided data input into a "numeric only" designated data field, or a numeric keyed input when the previous designated data field was only accepting alpha key inputs, and a predetermined command keyset input by the agent. Keyed inputs include: keyboard or keypad responses, touchscreen responses, and cursor-directed responses by the agent which are monitored and detected by the CC processor.

A data trimming tool and process may be provided with a redaction process. With the trimming tool, once the system determines the EOR time marker, the system can add a predetermined precursive EOR time period to the originally established EOR time marker resulting in an anticipatory EOR time marker. The anticipatory EOR time marker is then converted into a supplemental override start-record time marker. In this manner the only permanently saved audio data segment is the audio segment between the supplemental override EOR time set by the redaction process and system and the originally established EOR time. Stated otherwise the precursive or anticipatory EOR time is converted to a supplemental override start record time marker and the audio segment between the override start-record time marker and the original EOR time marker designates the time-based boundaries of the permanently saved audio file segment.

In a further enhancement of the present invention, the redaction process utilizes in interactive voice response or IVR methodology. One embodiment of the invention uses an IVR interactive data field. With respect to a data input field which is designated as an IVR interactive data field, the CC processor monitors on the agent's terminal and when the agent seeks to enter data into the interactive data field (or confirm, via an audio presentation to the customer), the start-record marker is generated. This IVR process is activated based upon interaction with the designated data filed presented to the agent. The initial start-record time marker may be set by the agent with data input activity in the IVR interactive data field. The EOR generation is discussed above.

The trimming functions described herein can be employed to create precursive record ON times, successive record ON times, precursive record OFF times, successive record OFF times, all in conjunction with the IVR processes.

Trimming silent periods of low speech volume and "no audio recorded" periods is also a permitted function. These silent periods are cut or redacted from the to-be-permanently-saved audio record.

In a further enhancement, with respect to the IVR process and the EOR, the agent, moving to the next data input field triggers to end of recording marker.

The invention also involves a call center with a redactor system for redacting audio data segments from a captured audio file. In this call center redactor system, the system includes an audio data store for the audio data captured from the comm session. The audio data store is associated with the CC database. The CC database has a plurality of data input forms which are generated for display on the agent's computer monitor. These forms have designated data fields therein. The call center redactor system includes a data input monitor which is coupled to the CC processor and is activated based upon the agent's data input into the designated data field. All data input, output and transferred through the agent's computer-based terminal is processed by the CC processor. A start-recording trigger is also connected and coupled to the CC processor. The start record trigger is activated upon the agent's data input into the designated data field. The start record trigger generates a start record time marker which is associated with the stored audio data.

The CC processor also includes a timing circuit and agent monitor circuit for determining the EOR time marker. A filter is coupled to the CC processor which generates a throughput which throughput data is the permanently saved audio data. This permanently saved audio data is data bounded by the start record time marker and the EOR time marker. The permanently saved audio data store holds the permanently saved audio data received from the filter as filter throughput. A crypto data shredder is utilized to shred the stored audio data, but not the permanently saved audio data segments, from the CC database.

The call center redactor system in another embodiment includes an IVR interactive data fields as described above for interactive voice responses by the customer, in response to the machine generated questions.

The call center redactor system also includes a process for adding predetermined precursive time periods to the start record time marker to provide the anticipatory start record time marker. In a further embodiment, the call center redactor system includes an EOR time marker generator which operation is discussed above.

BRIEF DESCRIPTION OF THE DRAWINGS

Further objects and advantages of the present invention can be found in the detailed description of the preferred embodiments when taken in conjunction with the accompanying drawings in which:

FIGS. 3A through 3D diagrammatically illustrate functional modules and steps for a basic call center process with several redaction functions in accordance with the principles of the present invention.

FIGS. 5A, 5B, 6, and 7 diagrammatically illustrate timing charts showing various redaction functions, tools and trimming functions in accordance with the principles of the present invention.

DETAILED DESCRIPTION OF THE PREFERRED EMBODIMENTS

Figure 1:
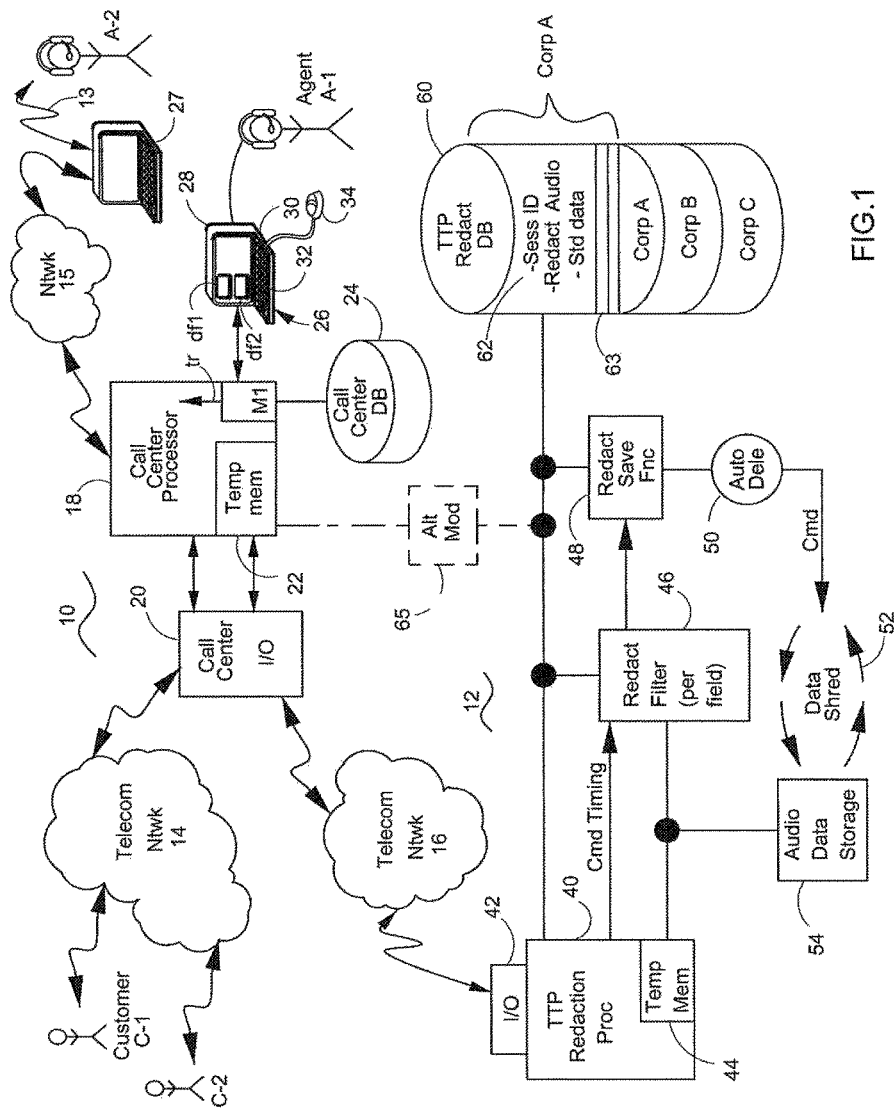
FIG. 1 diagrammatically illustrates both a call center system 10 and its functional blocks and a redaction system 12 and its functional blocks in accordance with the principles of the present invention. Call center system 10 and redaction system 12 are coupled together via a telecommunications network 16 and FIG. 1 diagrammatically illustrates, as an alternate embodiment, redaction system 12 generating delete-audio-record commands to the call center 10 after processing and redacting key audio segments from the entire audio data file.

The present invention relates to a redaction process and a redaction system for deleting either unnecessary data from an audio recording or redacting non-confirmatory data and saving only select sensitive personal identifying information (PII), medical information or other audio representations of high security data or confidential data obtained during a customer-agent communications session with a call center. Trimming of such PII, medical data or high security data prior to permanent storage for confirmatory purposes is also provided. Similar numerals designate similar item in the drawings. An Abbreviations Table is provided near the end of this detailed description which lists certain items found in the drawings and discussed herein.

FIG. 1 diagrammatically illustrates the major functional blocks in the call center ("CC") 12 which operate in conjunction with redaction subsystem 12. Call-center 10 is coupled or connected via telecom network 16 to redaction system 12. Customers C1 and C2 communicate with call-center 10 via telecom network 14. Call-center 10 includes CC processor 18, CC input/output interface module 20 and CC database 24. Call-center 18 has temporary memory 22 used primarily to store operational programs and data subject to processing. CC Agents A1 and A2 are connected and coupled to call-center processor 18 either via a local area network or a wide area network (see Agent terminal 26) or are connected via telecom network 15 to the processor (see Agent A2).

As is commonly known, agent A1 and agent A2 utilize a headset (not numbered) having an earphone or a speaker and a microphone to handle audio or voice-based communications between a customer calling call-center 10 and the agent at the agent terminal. The agent terminal may be a desktop computer, a dumb terminal connected to CC processor 18, a laptop, a tablet or, in some situations, a smart phone. With respect to agent A2, that agent is coupled to his or her terminal via wireless network 13 and terminal 27 is connected via a wireless network to network 15 which, in turn, is coupled to CC processor 18. Of course, CC processor 18 utilizes various input/output interfaces for its interactions with all the networks.

Agent terminal 26 includes a processor 30, keypad/keyboard/touch screen input 32, a mouse 34, and a display monitor 28. Computer-based device 32 is an user's interactive data input device. The headset is connected to the terminal. As is known in the call center industry, when a comm session is initiated between customer C1 and agent A1, the CC processor 18 obtains data forms from database 24 and displays those data forms on agent monitor 28. Those data forms have various data fields therein. See FIG. 2A, see also the Call Center Database Table below. Sometimes the system pre-loads data into a data field for view by the agent. The agent may orally confirm this data (such as credit card account data) with the customer during a comm session. In connection with the present invention, agent interactions in data fields df1, df2 are important as explained later.

Redaction subsystem 12 is coupled to call-center 10 via telecom network 16. Redaction subsystem 12 includes input/ output interface 42 and redaction processor 40. In the illustrated embodiment in FIG. 1, redaction subsystem 12 is a trusted third-party or TTP system. The trusted third-party TTP system provides redaction services under contract to the operator of call-center 10. In this manner call-center 10 can delete the entire audio file thereby trusting the TTP redaction system 12 to handle the entire raw audio file and ultimately provide back only non-redacted audio segments. In this manner, the call center operator can achieve higher compliance with data security protocols, reduce data storage costs and processing overhead (reduced need to encrypt numerous, large files).

Redaction subsystem 12 includes redaction processor 40 and temporary memory 44. Redaction processor 40 is connected to redaction filter 46. Since the redaction system operates on the entire audio file (the original or raw audio data file), the entire audio data file is stored in audio data storage unit 54. Audio data storage unit 54 may be part of redaction database 60, but is illustrated as being separate herein due to the functionality of the data storage space. Redaction system 12 includes redact-save-function module 48 which operates concurrently with automatic deletion function module 50.

Redaction subsystem 12 includes redaction database 60. Specific data record retained by redaction database 60 includes records 62, 63 which records are comm session ID, the non-redacted audio segments and other standard comm session data. Database 60 includes numerous records 63 etc.

Since redaction subsystem 12 is operated by a trusted third-party TTP, the redaction system operator (the TTP Sys Op) can provide services independently to corporations A, B and C. Redaction database 60 has specific handling operations for multiple corporate data collections A, B and C. In this sense with respect to FIG. 1, call-center 10 can be located in-house in corporation A. On the other hand, TTP redaction system 12 can operate in conjunction with another companies (Corp B data in DB 60) which is completely independent of the in-house call center (Corp A data in DB 60).

In some situations, the entire audio record of the comm session is stored by CC processor 18 both in CC temporary storage 22 and in CC database 24. FIG. 1 shows, as an alternate function, alternate delete-command module 65 which provides a delete-all-audio-file-data command direct to CC processor 18. As used herein, a command is identical to an instruction. As a result, CC processor 18 would delete the entire audio file from temporary memory 22 and CC database 24. The redaction subsystem 12 sends comm session data, including the non-redacted and excerpted audio file data segments, back to CC processor 18 and CC DB 24.

The operations of call center 10 are fairly well documented in the prior art. However certain processing sub-modules for the redaction function and redaction subsystem 12 are employed by CC processor 18. For example, CC database 24 holds a plurality of data forms which the agent should complete during a particular or unique comm session with a customer. These data forms in CC database 24 need predetermined data fields which the agent should complete. These predetermined data fields df1, df2 are shown in FIG. 1 on the agent's screen or computer monitor. When agent A begins inputting data into data field df1, CC processor 18 has a monitor M1 which generates a CC start record timing signal TR. This CC start timing signal as well as other timing signals are sent with the entire audio file to redaction subsystem 12. The audio file transmission may be part of a batch communications sent to redaction subsystem 12 periodically (daily, hourly, etc.) or may be sent in substantially real time (ignoring processing and network transport times) to redaction subsystem 12. The audio file may be integrated with the comm session data transferred from CC processor 18 via network 16 to redaction processor 40. Therefore, real-time redaction is possible as well as delayed redaction and batch processing by subsystem 12.

After the agent completes data entry into designated data field df1, the agent moves his or her cursor or executes a keypad activity from data field df1 to df2. That shift from data field df1 to df2 is captured by monitor M1 in processor 18 and generates a CC end-of-recording or CC EOR (end-of-recording) or an end-of-file (EOF) trigger TR for data field df1. M1 generates some type of CC start and CC stop markers for data df1 at the A1 terminal. The other software routines which may be executed by CC processor 18 to generate the EOR are discussed later. Some of these EOR subroutines could be resident in CC processor 18, CC temporary memory 22 and CC database 24 or may be resident in redaction processor 40, temporary memory 44 and redaction database 60.

The nomenclature CC start-record and CC EOR, when taken in conjunction with agent terminal 26 and CC processor 18 are different than the redaction or Red start-record and Red EOR nomenclature used in conjunction with redaction subsystem 12. Although the timing signals are different, the signals are related to each other in that with respect to CC EOR and Red EOR, the CC EOR is captured and stored in the comm session data in CC DB 24, which comm session data is later transmitted to redaction subsystem 12 (if system 10 and 12 are integrated, they operate in real time). Stated otherwise, the CC start-record is used as a basis to generate the Red start-record. The CC EOR may be used as a basis for the Red EOR or may be discarded as discussed later in connection with the generation of the EOR in the redaction system 12. Timing signals in CC processor 18 are always referred to as CC start-record and CC EOR, in contrast to "start-record" and "EOR" timing signals in redaction system 12.

Figure 2A:
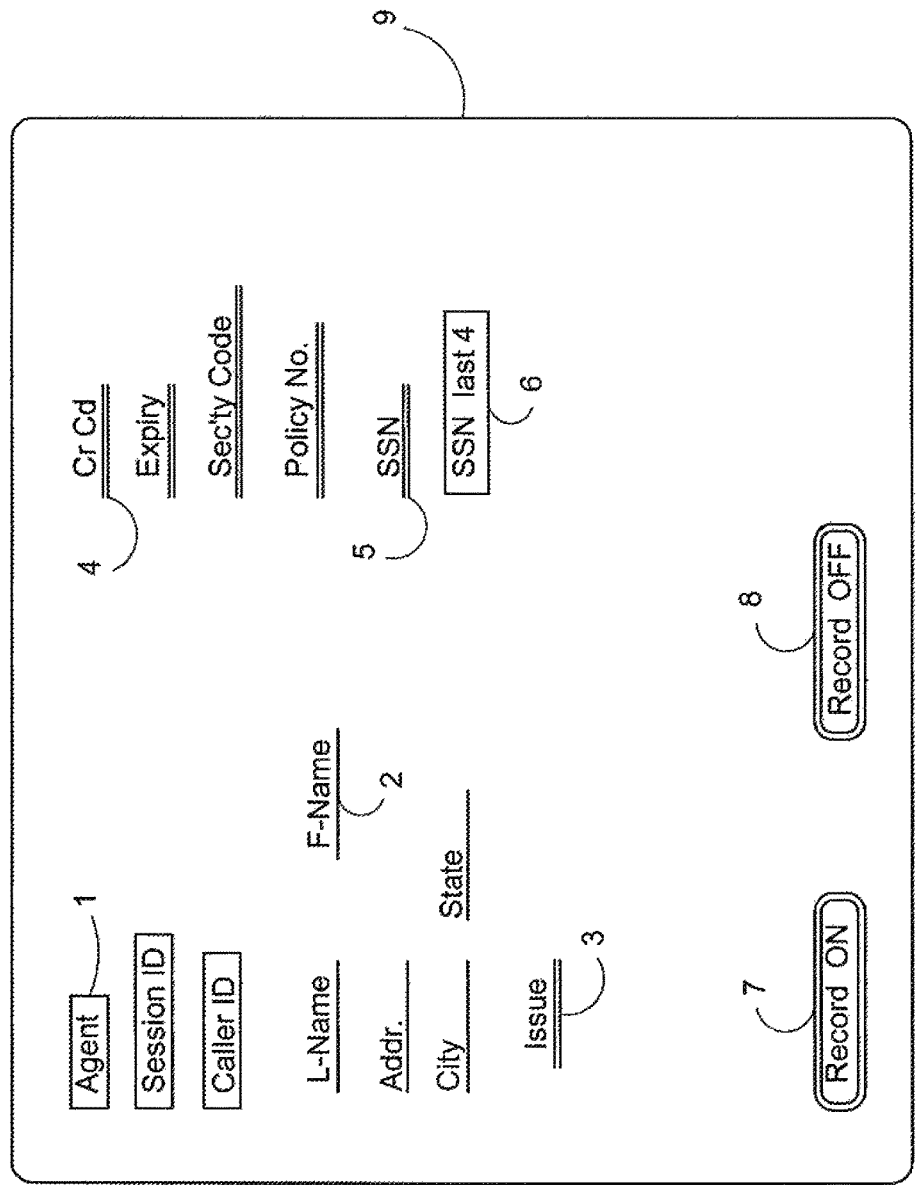
FIG. 2A shows a gross example of a data form produced by the database and processor and displayed on an agent terminal-computer, showing samples of designated, nondesignated and truncated data fields.

FIG. 2A shows a gross example of a data form 9 produced by the database 24 and processor 18 and displayed on agent terminal-computer 26, namely agent display monitor 28. The items in the single line box 1 are fully displayed on terminal 26. Items underlined with a single line 2 are displayed and should be completed by the agent. In a general sense, these are nondesignated fields. See the UPP Table below. The items listed with a double underline 3 are designated fields that cause a start-record time marker. The credit card data field 4 requires input of the complete credit card data. Subsequently in connection with the display screen database form after an input of the social security number (SSN) field 5, the agent's display screen shows only the last 4 SSN digits in field 6. Also, the database form 9 includes manual record ON active button and record OFF active button. The functions are in the double line box 9.

Figure 2B:
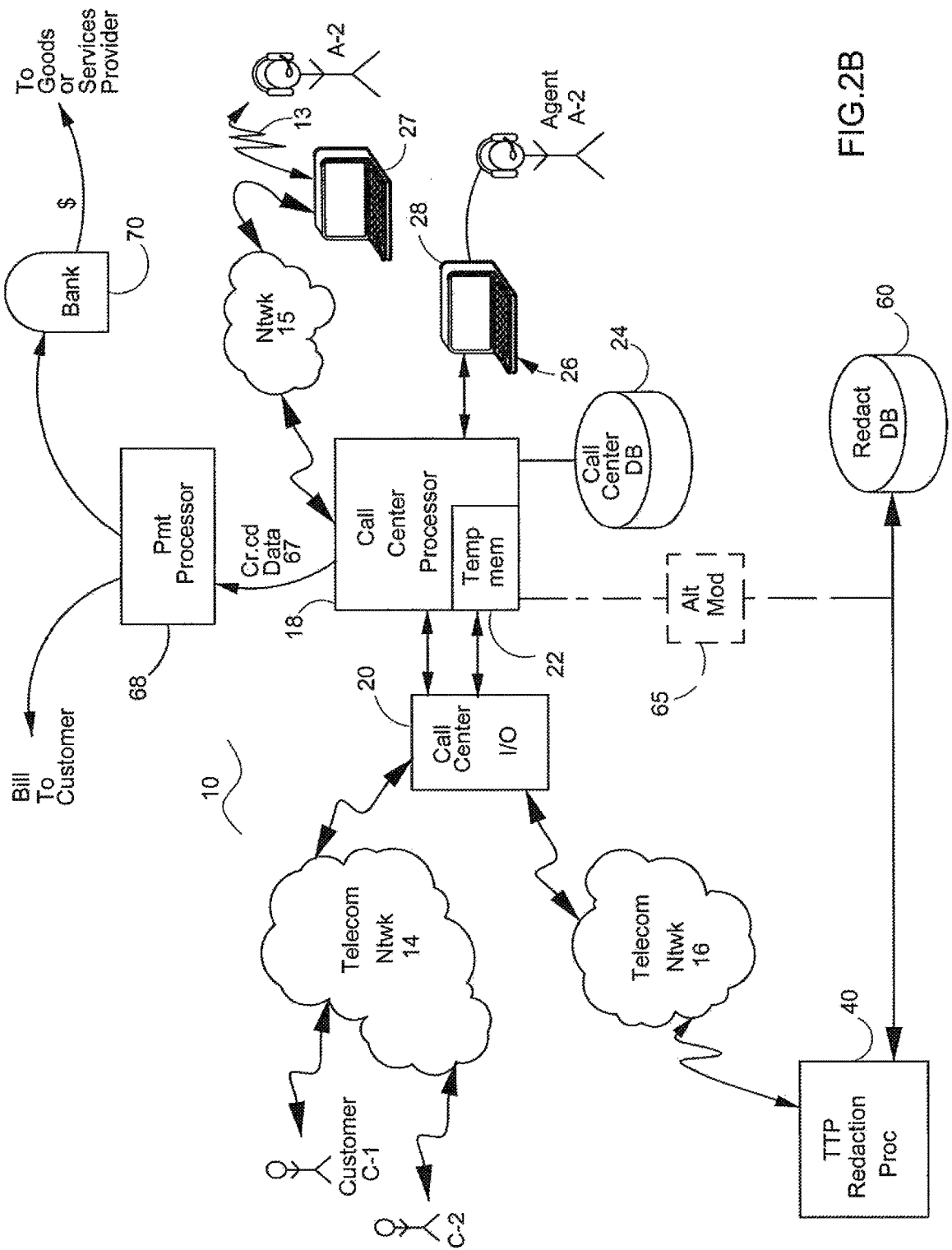
FIG. 2B diagrammatically illustrates the call center handling payments and account inquiries for multiple call-center customers.

FIG. 2B diagrammatically shows call center 10 engaging in a payment process initiated by customer C1 with agent A1. In this situation customer C1 has requested goods or services from a vendor who is a business customer of call center 10. The agent has processed the customer's order and has accepted credit card data orally from customer C1. The agent enters the card data into data field df1 which triggers CC start-record and subsequently CC EOR trigger. That credit card data 67 is sent from CC processor 18 to payment processor 68. Payment processor 68 then transfers data and commands to bank 70 which delivers money to the vendor providing goods or services to the customer. Payment processor 68 also sends an invoice or bill to the customer for such purchase. Payment processor 68 refers to several layers of organizations as does bank function block 70. It is well know that credit card account data is highly confidential and is high security data which must be handled by CC 10 with special care. Although the initial capture of credit card data by the agent and CC processor 18, CC memory 22 and CC database 24 is necessary to complete the C1 transaction, that credit data or sizable portion of the credit card data should be scrubbed and permanently deleted. Hence the need for TTP redaction processor 40 and redact database 60.

FIGS. 3A through 3D and FIGS. 4A through 4D are discussed concurrently with the timing diagrams in FIGS. 5, 6 and 7. With respect to all flowcharts and process diagrams herein, the steps and functional modules can be reorganized as needed to achieve more efficient operations. The modules and the sequence of the steps or modules is presented herein only to provide an understanding of the methods, functions and systems employed in connection with the principles of the present invention.

FIG. 3 provides a process flowchart for a call center process with basic redaction function in step 200. In step 210, a call is received by Center 10. Center 10 assigns, in step 212, a session ID to the event. In step 214, the center identifies the customer or caller. It is well-known that customers may have a user personal profile or UPP stored in CC database 24. If the customer has never engaged in the call center, a temporary UPP or caller profile is established. Sometimes companies will gather customer data such as account information and bundle that customer data and account information and UPP customer data prior to transmitting the data and the call to the call center. The call center stores that customer UPP and account data in CC database 24 prior to the agent initiating the comm session with the customer. Sometimes the data transferred to the call center is concurrent with the agent initiating the comm session with the customer. In step 216, the center assigns the comm session to an agent. In step 218, the comm session begins between customer and the agent. CC database 2 and CC processor 18 initiates a session log with a date, time, agent, and customer UPP.

In step 220, CC processor 18 presents a data input form as a screen presentation to the agent at terminal 26. In step 222, processor 18 audibly presents to the customer a "consent to record" announcement for the comm session. At this time call center 10 is records the "consent agreed to" interaction with the customer (if no consent is given, the session ends). The "consent agreed" communication is recorded by center 10. This is a critical audio segment data to be saved. Other consent recording routines may be utilized.

If the customer indicates his or her consent to the recording, processor 18 turns ON the temporary save audio record function for the entire comm session in step 224. Alternatively, in step 226, the agent may manually turn ON the record function. Some call center agents are provided with functional commands or buttons to turn ON and OFF recording functions for the call center.

Continuing on to FIG. 3B, in step 228, CC processor 18 sets one type of CC start-record time marker when the agent initiates a manual record ON command generally indicated in FIG. 5A as tm-1. The "consent ack" audio track or segment is t-0 to t-consent in FIGS. 5, 6 and 7. "M" in tm-1 refers to manual activation of recording ON function by the agent. The record OFF function is timing marker tm-2 in the timing diagrams. In step 230 CC processor 18 records the critical audio segment for the comm session until the agent selects record OFF (tm-2).

In step 232, the agent inputs data into the displayed data fields (see FIG. 1, df1) in his or her terminal 26. In step 234 the data input in display field df1 triggers a data field trigger (module M1 in FIG. 1 and trigger TR) and in the timing diagrams at t-df-1 (this t-df-1 FIG. 5A is the $1^{st}$ time marker to data field df1 in FIG. 1, "t-df-2" FIG. 5A is the $2^{nd}$ time marker for data field df1 in FIG. 1). Although the initial data field time marker can be categorized as a CC-df1-t1 time marker (from the CC 18 processor, data field df1, $1^{st}$ time marker "t1"), that CC-df1-t1 time marker is subsequently processed by redaction system 12. The Redact t-df-1 may ultimately be different than CC-df1-t1 time marker, however the two time markers are interrelated by algorithms and different processing times as discussed below.

In step 236, a timeout clock t-out may be started. Time-out periods are noted herein as "tx," such that the time out period from time marker t-df1 is calculated as "t-df1 plus tx" which may be a precursive time or a successive time altering t-df1. The timeout clock in step 236 typically is be processed by redaction processor 40. However, if the redaction process is integrated with call center 10, the timeout clock is processed by CC processor 18. The timeout clock can be used for several purposes including an automatic record OFF function, if the agent fails to respond to complete the data field in t-out period, it may be dependent upon the length of the data entry in a particular data field, and/or a projected speech time of the customer to orally deliver the information to the agent, thereby permitting the agent to enter the audible information into the call center system.

In step 238, when the agent moves from field df1 to the next data field df2 (FIG. 1) and CC processor 18 generates two triggers, one being the second end-of-field EOF trigger for data field df1 (a timing marker as t-df2 on timeline 400, FIG. 5A) and the second being the initial data trigger for data field df2 (not shown in FIG. 5A). This initial data trigger for data field df2 assumes that field df2 is a designated data field ("designated" referring to a permanent save audio event). If NOT, then there is no initial data trigger for data field df2 because that data field is not subject to "save audio file segment." Stated otherwise, the data may be important, but the audio file is not needed for confirmation purposes. If designated, the CC df2 EOF (end-of-file) trigger is a CC df-2 start-record trigger. In the timing diagrams as discussed above, the CC df-2 start-record trigger is converted to an end-of-field EOF time marker flag shown as t-df2 in the timing diagrams, listing the EOF for data field df1.

Alternatively the EOF or end of field marker can be activated by the agent via terminal 26. EOF-EOR time markers are listed in the EOR Table below. Further, activation could a keyboard or keypad selection of the agent selection of the enter key, tab key, etc., any keyset representing a command or any other manual control. Cursor activation indicating a data field change to a different field is noted in step 238. The next data field may be either a "designated record data field" (indicating that audio segments should be recorded-saved for data entered in that field) or may be nondesignated (indicating that the audio segment should not be recorded-saved) as needed. In step 240 the system repeats the ON-OFF "save-do-redact" flags for all data fields as needed and as established by the call center management or the CC system operator. In step 242, the comm system and the process proceeds to FIG. 3C.

| UPP Table (example) |
| --- |
| name |
| address |
| phone number |
| account data |
| date of last inquiry |
| result of last inquiry |

| Call Center Database Table (example) |
| --- |
| Customer UPP |
| comm session ID |
| start time, end time |
| customer satisfied Yes/No |

| End of Recording (EOR) Table (example) |
| --- |
| (a) Agent shifting from one data input designated data field to another |
| (b) Data input into a designated data field exceeding a data field limit (e.g., df limit is 10 characters, agent inputs 11 characters) |
| (c) Agent keyed input command |
| (d) Agent manual "record OFF" command |
| (e) Keyed inputs from keys: enter, tab, page-up, page-down, etc. |
| (f) Keyed inputs: alpha key in numeric field, a numeric key in alpha field |
| (g) Keyed inputs: any predetermined command keyset |
| (h) Agent voice commands |

| Keyed Input Table (example) |
| --- |
| keyboard responses |
| keypad responses |
| touch screen responses |
| cursor-directed responses |
| voice commands |

Figure 3A:
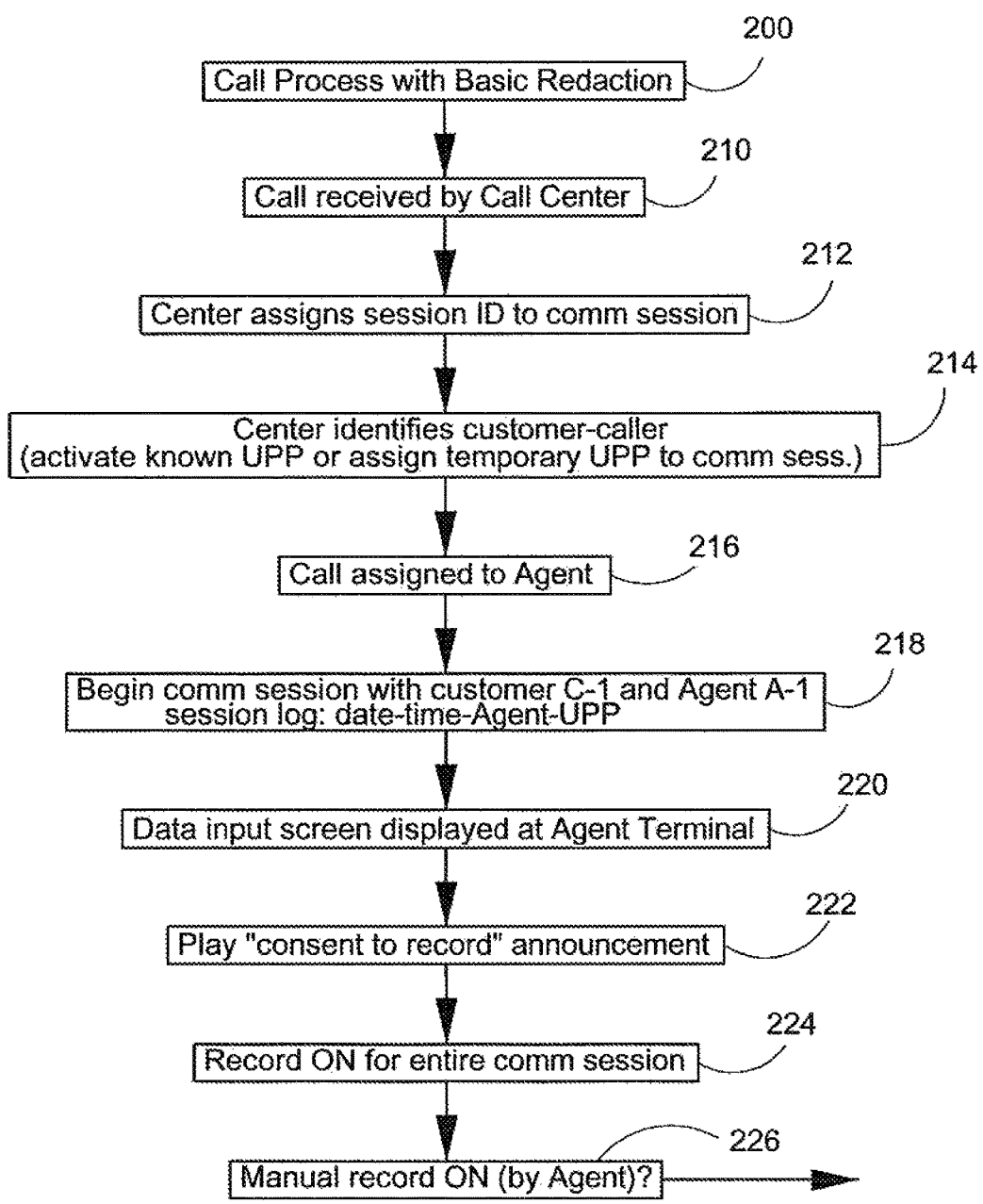
Figure 3C:
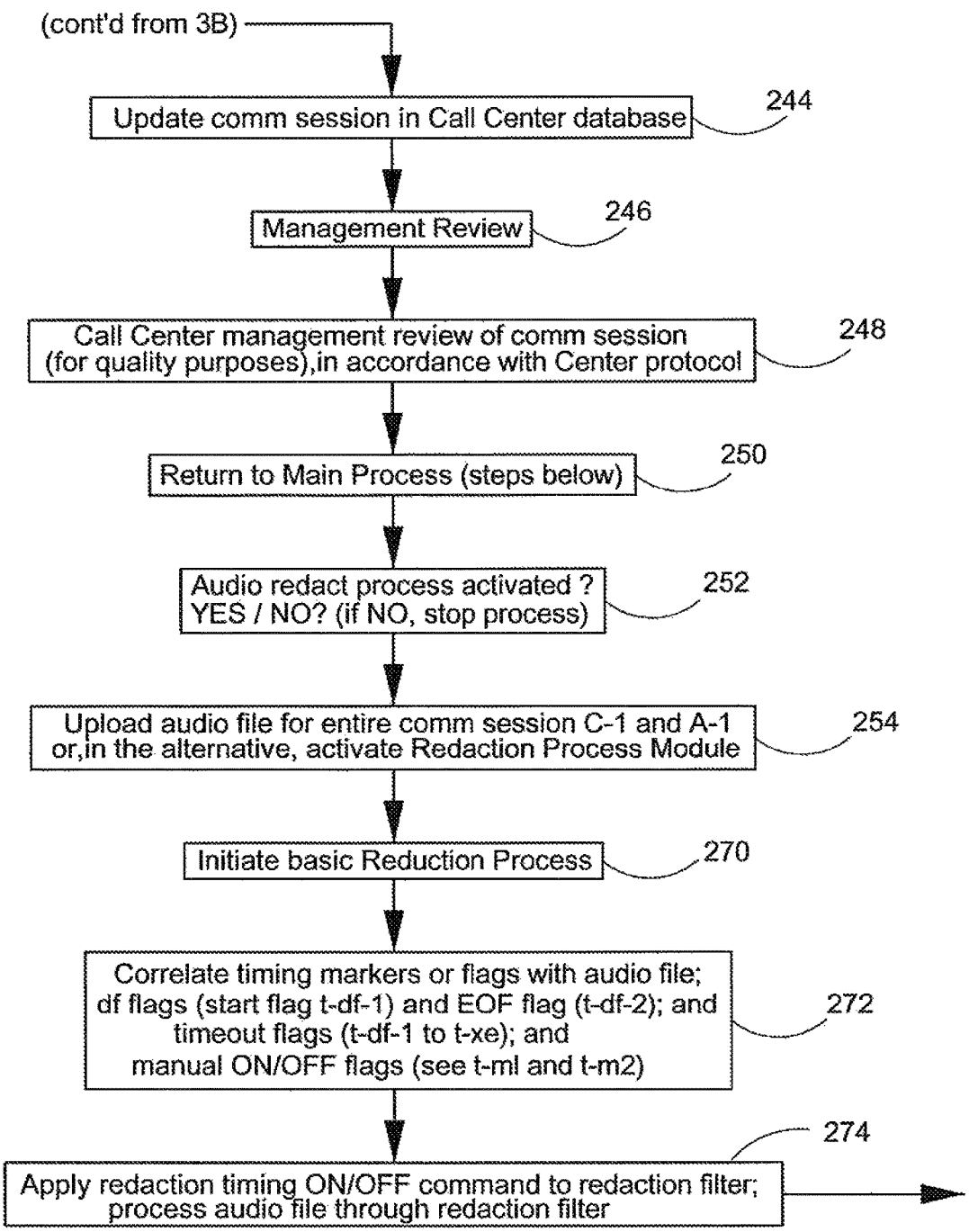

In FIG. 3C, call center 10 and CC processor 18 update the comm session record in CC database 24 as noted in step 244. In step 246 CC management may review the comm session audio file and particularly the audio recording for the entire session for quality control purposes. This is noted in steps 246, 248. In step 250, a return to the main process is noted. In step 252 an inquiry is made as to whether the audio redact process has been activated. If NO the process stops. If YES, the process proceeds to step 254. In step 254, the audio file is uploaded to the redaction subsystem 12 for the entire communication session between customer C1 and agent A1. In the alternative, in an integrated system, call center processor 18 activates redaction processor 40.

In step 270, systems 10, 12 initiate the basic redaction process. Step 272 is primarily processed by the redaction subsystem 12. A correlation is made between the timing markers or flags and the raw audio data file which has been uploaded into the redaction subsystem 12. The audio file is stored in data storage 54. The start record timing flag and end of file EOF flag and the pre-set timeout flags are noted. Also, in step 272, the manual record ON/OFF flags are noted and correlated to the audio file.

Referring to FIGS. 5A and 5B, the original audio recording for the comm session is shown in connection with timeline 400 and audio data file 402. The timing flags for the "consent acknowledgment" is noted between times t-0 and t-consent. The manual record ON timing marker or flag is noted at t-m1. The record OFF flag is noted that time t-m2. The timing marker for the designated data field is initially designated as t-df-1. When the end of field or EOF timing marker is triggered by the events discussed above in the EOR Table, the EOF timing marker t-df-2 is noted in connection with timeline 400.

As indicated in the functional joinder of FIGS. 5A and 5B, redaction system 12 processes a redact function 405 to generate an "audio permanent save" result on timeline 402. Effectively the audio signal is chopped, redacted or excerpted and certain segments are extracted from the original signal showed on timeline 400. Therefore the consent segment from time t-0 to the time t-consent is saved, the segment between the manual record ON audio segment from t-m1 to t-m2 is saved and the designated data field audio segment from t-df-1 to t-df-2 is saved. This is noted on timeline 402 of FIG. 5B. Compression of the audio data in indicated by compression function 406, the result being shown by double line arrow 408 further resulting in a smaller data packet signal 410 which includes the comm session ID, the date, the start time of the comm session, the end time of the comm session, the permanently saved audio (now compressed), the agent ID, the customer UPP ID and other comm session standard data. This re-configured data packet is ultimately saved in redaction database 60 and is also transferred to call center processor 18 and saved in CC database 24. The smaller data packet 410 can be tailored to meet "reasonable data security" protocols in compliance with organizational data breach prevention protocols by multiple redaction operations over longer periods of time. For example, the CC system 10 need only save the audio portion for the last 4 digits of the customer's credit card data to confirm the credit transaction. A CC system data breach would not then reveal the full account data to intruders.

Returning to FIG. 3C, the basic redaction process noted in step 270 activates the following process in step 272 which correlates the timing markers or flags from CC processor 18 and monitor M1 (based on multiple triggers TR) and sets the audio data save flag ON and audio data save OFF flag based upon various conditions. One of those conditions is agent manual ON/OFF flags noted in the timing diagrams FIGS. 5A and 5B between t-m1 and t-m2. Another basic redaction process is the redaction of audio data beyond timeout flags t-df-1 and t-df-2. The chopped up non-redacted audio signal on timeline 402 is then compressed to eliminate "no signal" segments thereby reasonably reducing the data storage requirements for the audio signal and further increasing data security for the permanently saved, redacted and compressed audio signals in signal packet 410. This reduces data storage charges and overhead and encryption processing time.

As for timeout period tx, timing diagrams at FIGS. 6 and 7 apply this redaction theory. As noted by function block 411 joining FIGS. 6 and 7, the resulting comm session audio permanent save 406 has been altered based upon predetermined time periods "txp" and "txe" relative to the manual record ON/OFF timeframe, t-m1 and t-m2. The predetermined time period "txp" is related to the manual record ON time t-m1. A predetermined time periods tx, shown as "txp2" and "txe2" has been added to the designated save-record period initially marked by t-df-1 and t-df-2. The alpha character "p" refers to predetermined time periods added to the front end or beginning of a certain record ON time marker (precursive) whereas predetermined time periods (tx) identified as "e" (see txe2) have been added at the end of the record ON time markers (successive), adding time out period tx to t-df-2.

Referring to timeline 412 in FIG. 7 and the manual recording ON recording OFF time frame bounded by t-m1 and t-m2, a precursive time period has been added to the record ON signal t-m1 thereby generating an anticipatory start-record time marker txp. For further details of trimming processes, please see the Trim Table presented later herein.

As an example, if the agent was to request an account number from the customer, and the agent activated the manual record ON function after the customer speaks the account number, the recording of the audio session would be reset to a time earlier than the manual record ON time trigger.

In connection with an automatic precursive time period added to an automatic redaction trigger event, attention is directed to the automatic redaction event between t-df-1 and t-df-2. As indicated earlier in connection with FIGS. 5A and 5B, t-df-1 represents an action when the agent has initially begun inputting data into data field df1. The field indicator t-df-2 indicates when the agent has left that designated data field df1. As an example, if the designated data field contains credit card account information that the agent is manually entering account data based upon an oral presentation of information supplied by the customer, the automatic redaction system needs to begin recording the audio segment at a time prior to the detection of an input into the designated data field, that is, prior to t-df-1. Therefore a precursive predetermined time period is added to t-df-1. The predetermined time period tx needs to be added to the redaction segment thereby extending or moving back the redaction segment to a point earlier in time when the customer is audibly announcing the credit card number. Hence the record ON marker is moved to anticipatory start-record time txp2. This is an algorithm which relates the detected data input event into the designated data field generates an anticipatory start record time marker txp2.

In a similar manner, the redacted and to-be-permanently-saved audio segment can be expanded beyond the agent's action of leaving the designated data field df-1 (at timeline marker t-df-2). A predetermined successive time txe is the successive start-record time at txe2. The added time tx is the predetermined successive time added to the EOF. The reference "e" refers to an end event. As an example of the utility of this successive EOR time, resulting in extension of the EOR or end of record marker, the system may want to record a communication from the customer that "orally approves" the account number that was manually entered by the agent and was read back to the customer by the agent. The customer acknowledges that the announced account number is accurate and this acknowledgment confirmation is covered within the expanded redacted perm-save audio segment by time marker txe2. Another example to record and audible confirmation of a sale of goods or services.

Returning to FIG. 3C, in step 274, the redaction timing ON/OFF command (cmd) is applied to the redaction filter 46 shown in FIG. 1. The timing command CMD is applied by redaction processor 42 to redaction filter 46. The markers for the redaction are created by the redaction processor 40 which processes software algorithms operating on the raw audio data stored in audio data storage 54.

Figure 3D:
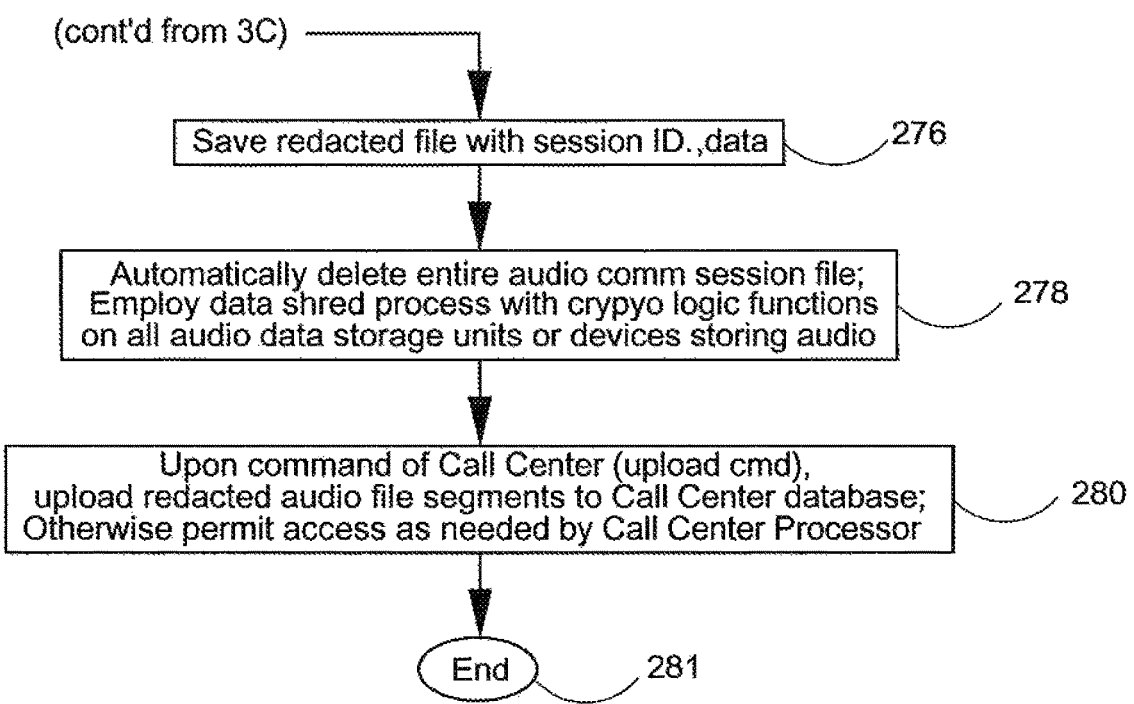

Continuing on to FIG. 3D and step 276, the redacted audio data material is the throughput through filter 46 and this throughput data is applied to redact-perm-save function block 48 in FIG. 1. Upon activation of permanent save function 48, the system automatically (a) saves the redacted audio segment in the redact database 60 and (b) generates a delete-all-audio data command in function 50. This delete entire audio comm session file command is applied to data shred operation 52 which operates on audio data storage 54. Preferably crypto logic functions are employed in a crypto shredding operation on audio data storage 54 and on any audio data stored in temporary memory 44 (if that memory is active) and via alternate module 65 to CC database 24 and CC temporary memory 22.

As discussed above in connection with a data packet 410 in FIG. 5B, as noted in FIG. 3D, at step 280, upon an upload command from call center 10, redaction subsystem 12 uploads the redacted audio data file segments into CC database 24. Otherwise CC processor 18 can access the compressed and permanently saved audio records by accessing the redaction database 60. The redact-permanently-save function 48 stores the redacted audio data in database 60 as part of the comm session ID and comm session standard data as noted in data record 62 of redaction database 60. The process ends at step 281.

It is important to note that the predetermined time tx can be set by the system operator or the call center operator based upon the type of data field then subject to agent interaction. For example, a longer precursive added time period tx-n1 may be needed to capture and save orally presented account data as compared with another precursive timeframe tx-n2 needed to capture and save a simple "yes" acknowledgment from the customer. The same is true for successive time periods added to the back end of the initial timeframes. Txp need not use the same tx, added time period, as txp, the successive added time period.

In this sense, the operator of redaction subsystem 12 can preset as a default certain precursive timeframes txp and certain successive time frames txe for certain types of data fields. During the utilization of these precursive and successive timeframes added to the initial time triggers, the call center operator can alter, by increasing or decreasing, a particular precursive or successive timeframe txp and txe. Further, the CC operator can utilize different precursive and successive timeframes txp and txe for each different CC agent to account for the speed of oral communication. The same is true of geographically diverse customers who speak at different speeds. When combined with IVR (interactive voice response), these different precursive and successive timeframes txp and txe are helpful.

The following Trim Table gives some examples of trimming the to-be-permanently-saved audio data. The Trim Table listed below is marked with alpha characters A, B, C, etc.

(A) Precursively moving back the start record timing marker (anticipatory start record marker)(the term "back" and "forward" referring to the direction of time in the timing diagrams, back sometimes referred to as advancing the time marker "back to an earlier time", forward sometimes referred to as moving the time marker to a later time)(see discussion of a precursive predetermined period of time).

(B) Successively moving forward the start record timing marker to a later time (see discussion of a successive predetermined period of time and moving the start time to a later start record time).

(C) Successively moving forward the EOR timing marker to a later EOR time (the supplemental EOR timing marker) (see discussion of a successive predetermined period of time and moving the EOR to a later time).

(D) Precursively moving back the EOR timing marker back to an earlier time using upon an algorithm based upon the start record time marker, such as advancing the EOR to a point in time a predetermined time period after the start time)(a precursive EOR, based upon both the start time and a mathematical formula which formula accounts for adding either (i) a set or predetermined period to time to the start time or (ii) a predetermined mathematical formula adding time to the start time (for example, a 12 character input results in adding 4 seconds plus 1 additional second for each input character over 12 (a character-dependent formula)), resulting in a supplemental EOR that overrides the EOF/EOR.

(E) Using the foregoing precursive and successive algorithms (A-D) with IVR interactive data fields.

Figure 4A:
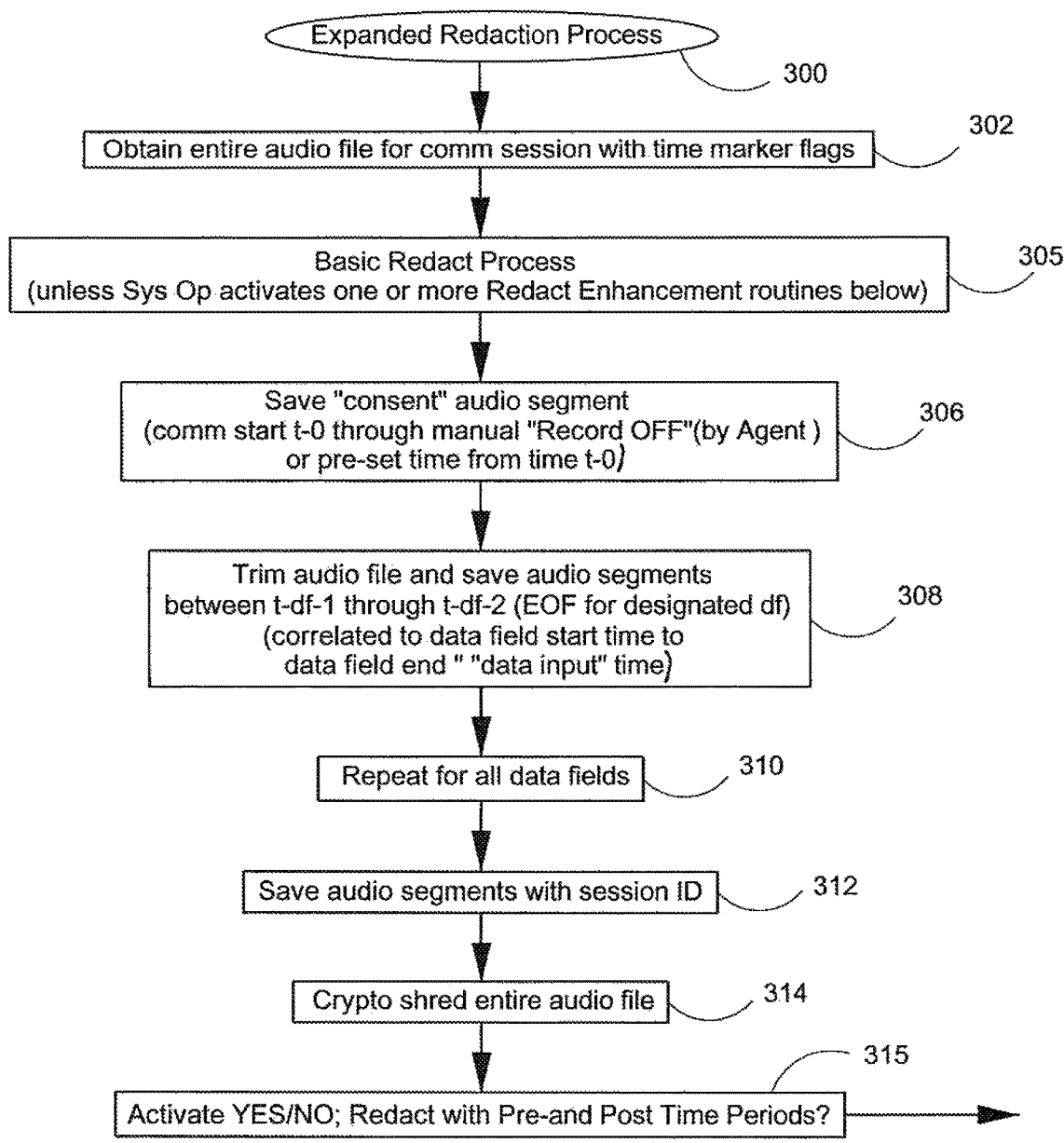
FIGS. 4A through 4C diagrammatically illustrate various expanded redaction processes in flowchart form in accordance with the principles of the present invention.

With respect to FIG. 4A, this flowchart and process module shows an expanded redaction process 300. In step 302 the redaction subsystem 12 obtains the entire audio file for the comm session with the initial time marker flags and stores that data in audio data storage 54. In step 305, the system 12 executes the basic Redact Process unless the system operator activates one or more of the Redact Enhancement Routines that are discussed later with respect to FIG. 4A. It should be noted that these redaction processes can be reorganized and combined or separated in order to achieve a more desirable permanently saved audio data segments for a particular comm session. Further, it should be noted that the redaction process can be engaged not only at or near the initial time of data acquisition by call center 10, but the redaction process can be re-engaged periodically to further compress the permanently saved audio files. For example it may be a reasonable security risk for the call center operator to save the oral presentation by the customer of his or her full credit card account number for a six month timeframe. That six (6) month time frame represents an enlarged period within which the customer may reject the credit card charge for the purchase of goods or services. After the six-month period the call center operator may re-engage the redaction processes on the audio files saved in redact database 62 eliminate all but the last four digits of the credit card account for all audio data files. This six-month delayed re-redaction is appropriate to securely save the account data and save only minimal indications of the account data in order to (a) save confirm data and (b) achieve business data breach protocol, both at the initial data-acquisition phase, but also for the 6 month re-redact data cycle after the need to permanently save all account data expires. Stated otherwise, there may be no business reason to save the full account data for more than 6 months.

In step 306, the redaction system 12 permanently saves the customer consent audio segment represented in timeline 400 at times t-0 through t-consent. The consent audio segment EOF may be triggered subject to a record OFF command by the agent or may be triggered based upon a preset time txe from start time t-0.

In step 308, the redaction process trims the audio data file between trigger events t-df-1 and t-df-2. This trimming in step 308 can shorten the to-be-saved data file such that only a predetermined time frame tx calculated in a precursive manner from the EOF time marker t-df-2 is part of the perm-save audio file. The trimmed time marker in the timeline 416 is noted as txt. This trimming of the initial timeframe t-df-1 and t-df-2 can be conducted precursively based upon the EOF or can be conducted successively based upon t-df-1, that is, advancing the trim marker forward a set period tx from the initial time marker t-df-1.

Of course there are many different algorithms which can be employed in a trimming operation. For example rather than trim a credit card account audio file to just the last four digits (see save data txt for t-df-2), a timing sequence can be employed with an algorithm that chops an audio representation of a 12 digit credit card account data into four different "permanent save timeframes." Some data security specialists would suggest that slicing a 12 digit data string into multiple slices and discarding intermediate slices provides a higher degree of data security than just saving the last four digits of the 12 digit credit card account number. This algorithm uses the start time and EOF/EOR and some mathematical chop function.

Another example for this trimming, multiple slicing and discarding of intermediate slices may be better applied to long audio recordings such as audio recordings regarding medical history obtained from a customer. In order to confirm that the customer provided reasonable information, the automated slicing and discarding of intermediate slices may be sufficient to establish that the customer did or did not inform a life insurance underwriter of the medical condition. The entire audio file may not be necessary, only some confirmatory portions. A medical data slice and chop may be reasonable to achieve PCI compliance.

Figure 4B:
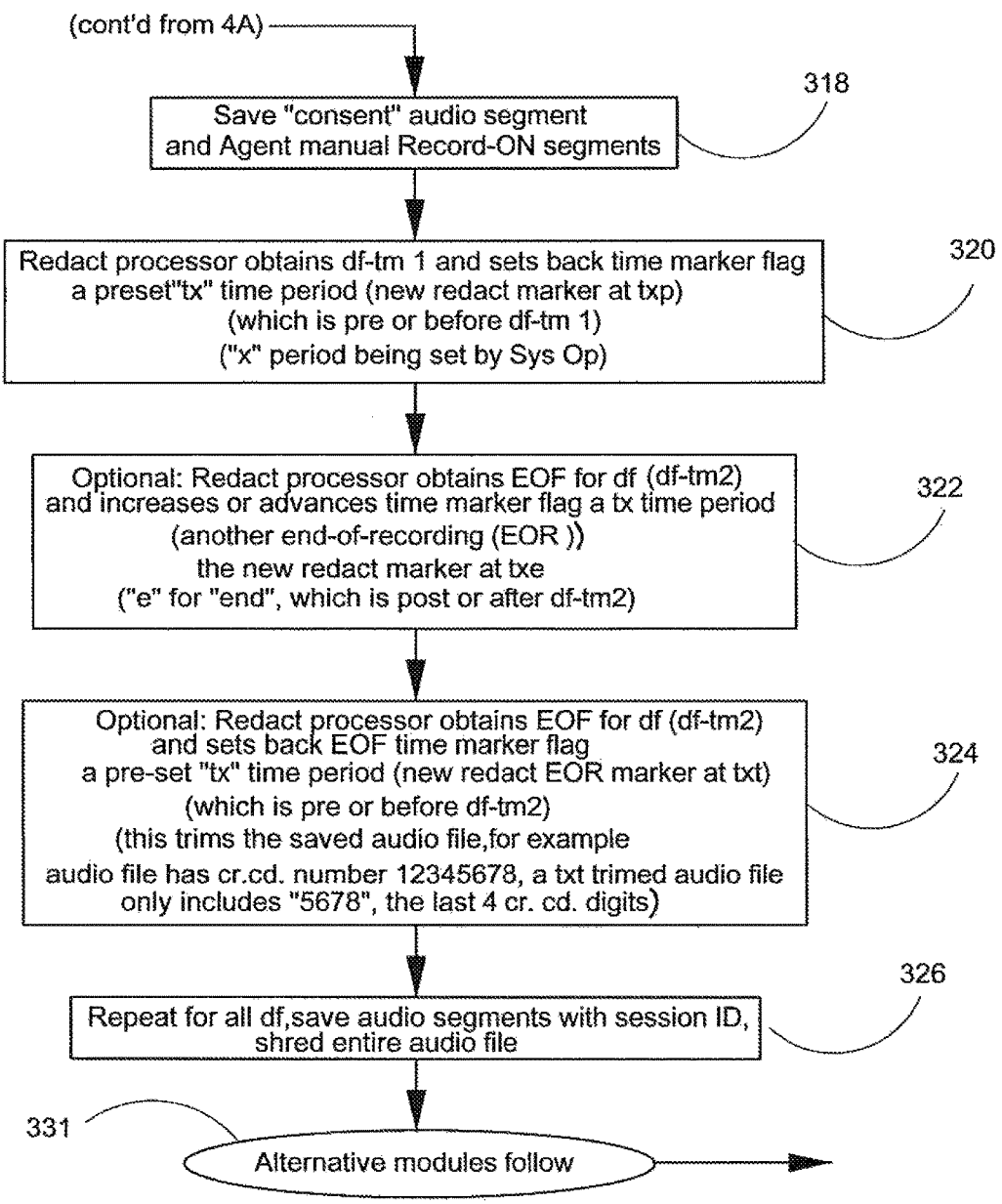

Continuing on in FIG. 4B and step 326, redaction system 12 saves the audio segments in redaction database 60 and deletes the entire audio data file from audio data storage 54.

In step 331, alternative modules may be activated by the Sys Op.

Figure 8:
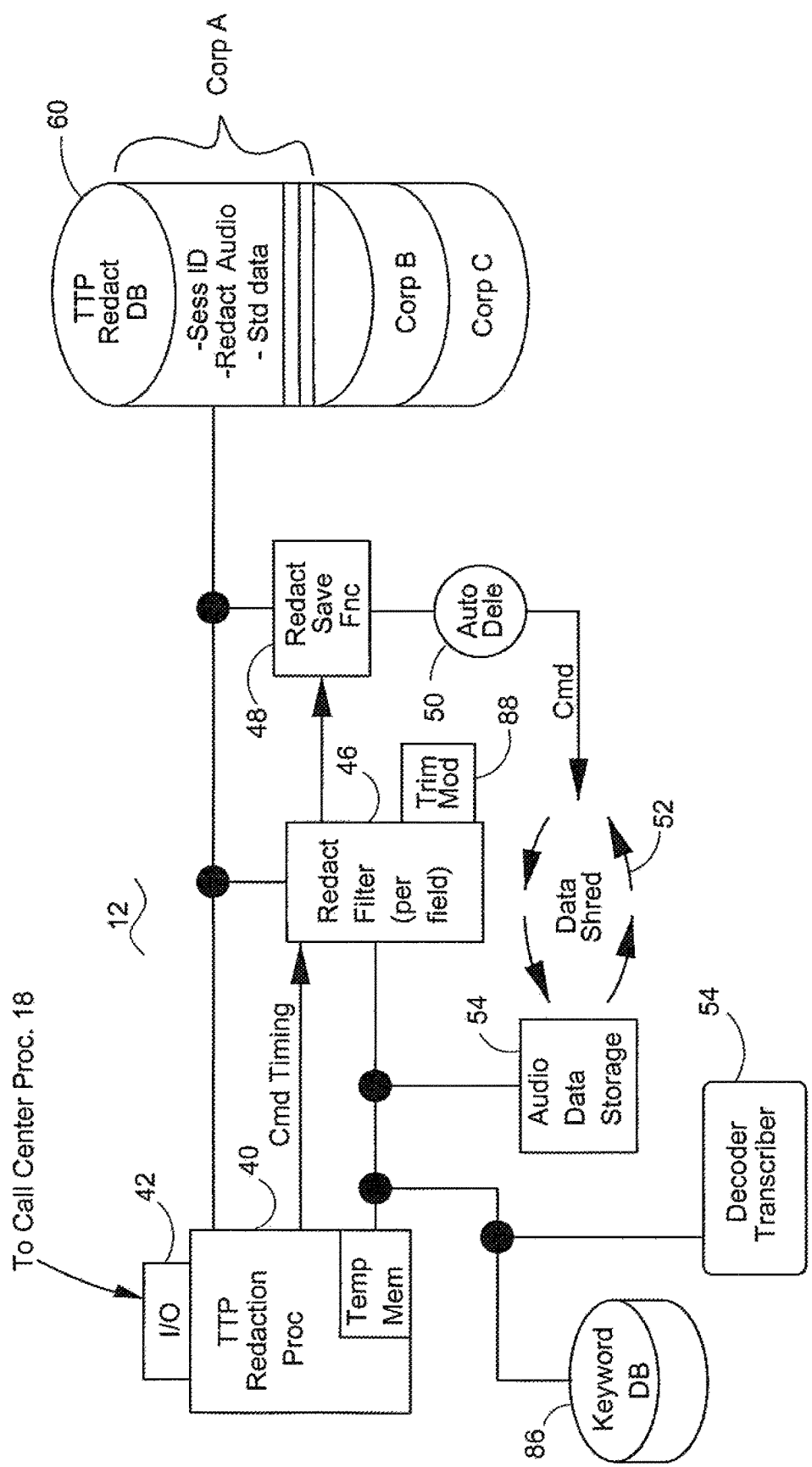
FIG. 8 diagrammatically illustrates audio decoding-transcriber.

FIG. 8 diagrammatically illustrates a redaction subsystem 12 with a decoder-transcriber 84 coupled to redaction processor 40 and audio data storage 54. The decoder and transcriber 84 saves transcribed data in data storage 54.

Figure 4C:
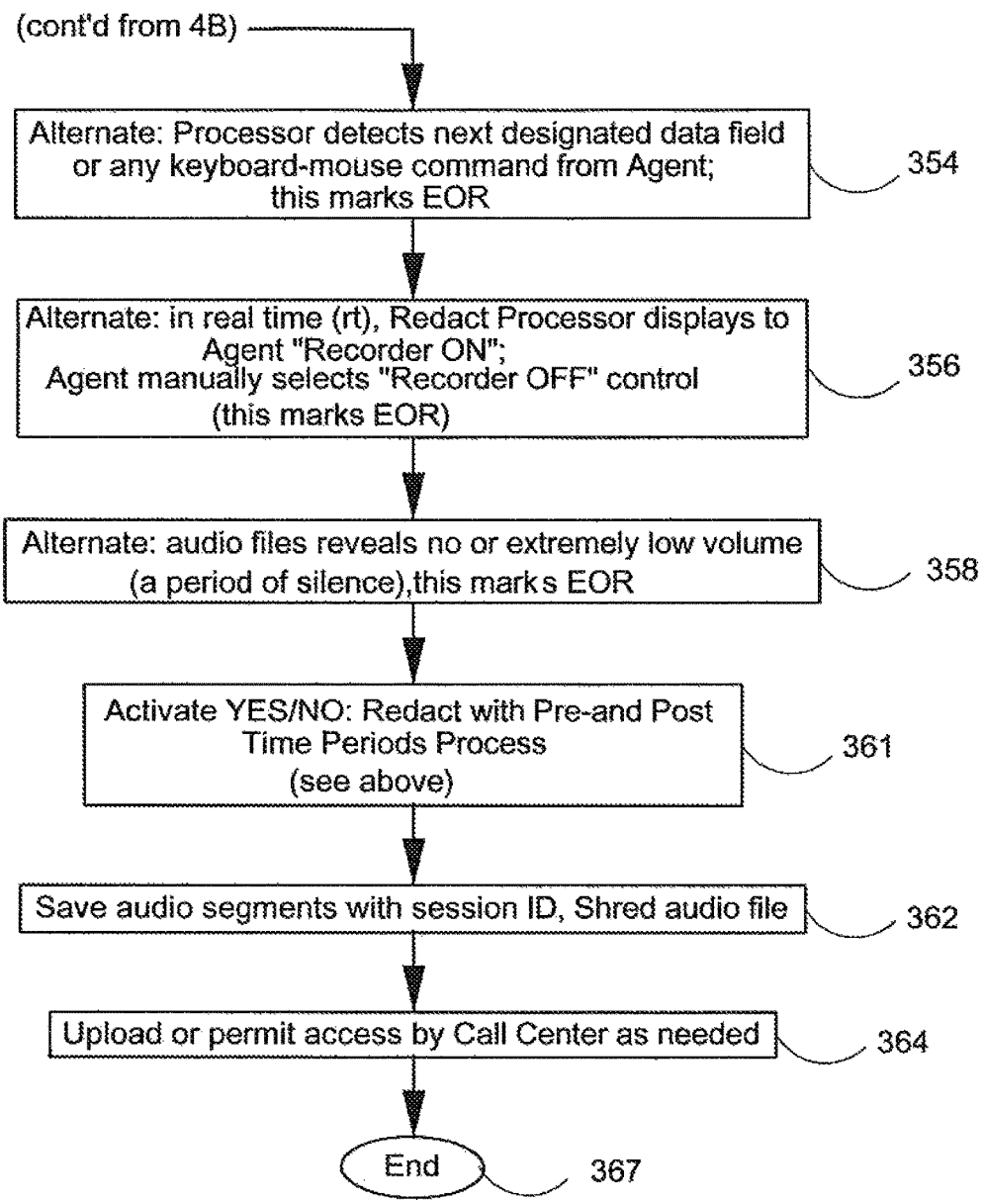

Alternatively in connection with step 354 in FIG. 4C, the processor may detect the next designated data field df2 FIG. 1 or any keyboard-keypad-mouse command which marks the EOR or EOF for that IVR recognition audio segment.

Step 356 provides another alternative. When the system has initially turned ON the recorder, the redaction system 12 may issue a command to CC processor 18 effectively to visually notify the agent of the record ON event. The processor, operating in connection with CC database 24, visually displays to the agent at terminal 26 that the audio recorder has been turned ON. The agent may manually select the recorder OFF control which marks the end of the recording session EOR or EOF for the audio segment to be saved.

Further record ON operations may be automatically engaged as needed. Stated otherwise, for an IVR interactive field, the record function may go ON and OFF as needed based upon agent curser position or agent "record ON" manual command and be turned OFF as described in the several different ways in connection with all other record OFF time markers.

In another alternative step 358, if the audio file reveals no sound from the customer or the agent for a predetermined period of time tx or notes only extremely low or nominal volume for a period of time, this indicates a period of silence on the line which may also mark EOF for the end of the IVR recording operation. In this control function tx is a minimum Record ON—save audio segment control.

In addition to the trimming actions discussed above, the redaction process can trim silent periods of low speech volume and no audio recorded periods which "silent periods" are in the middle of long audio recordings. These silent periods are cut or redacted from the saved audio record.

In step 361, the system operator or call center operator determines whether to activate the redaction process for pre- and post time periods txp or txe discussed above. In step 362 the audio segments are permanently saved in redaction database 60 and the audio files and transcribed data files are shredded in the audio storage database 54. In step 364 an upload command from the call center 10 is responded to and the saved audio files are sent to the call center. Otherwise, the call center is permitted access to redaction database 60. The process ends in step 367.

Figure 9:
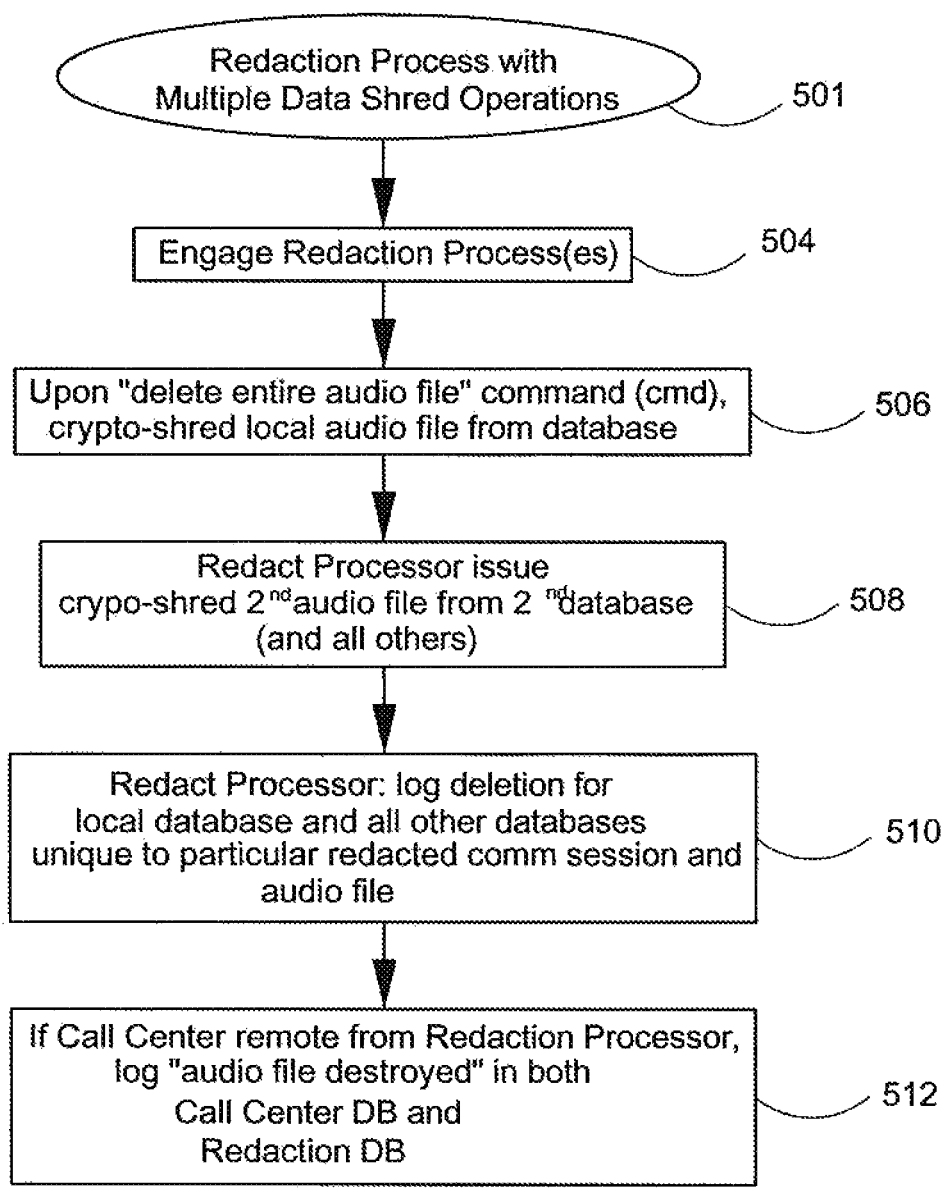
FIG. 9 diagrammatically illustrates the redaction process flowchart with multiple data shred operations.

FIG. 9 shows a redaction process with multiple data shred operations in functional block 501. In step 504 call center 10 (FIG. 1) activates redaction subsystem 12 as needed. In step 506, when redaction subsystem 12 issues a "delete entire audio file" command from auto delete function 50, the local audio data file in audio data storage 54 is deleted and preferably crypto shredded. In step 508 the redaction processor 40 issues a crypto shred second audio file command or instruction in connection with a particular second database. As earlier explained in connection with FIG. 1, alternate module 65 can be used to send this second delete or shred command to second database 24 via central processor 18, temporary storage 22 and CC database 24. In step 510 redaction processor 40 logs the "deletion of audio files from data storage 54" and deletion of other databases (such as CC database 24) in redaction database 60. The "delete all audio files" may be unique to a particular redacted comm session or may be global over a preset timeframe for a number of audio files. This "log of deletion" is stored in the comm session data record 62 in redact database 60. In step 512 if the call center is remote from the redaction processor, the audio file destroyed log data is stored both in CC database 24 and redact database 60.

Figure 10:
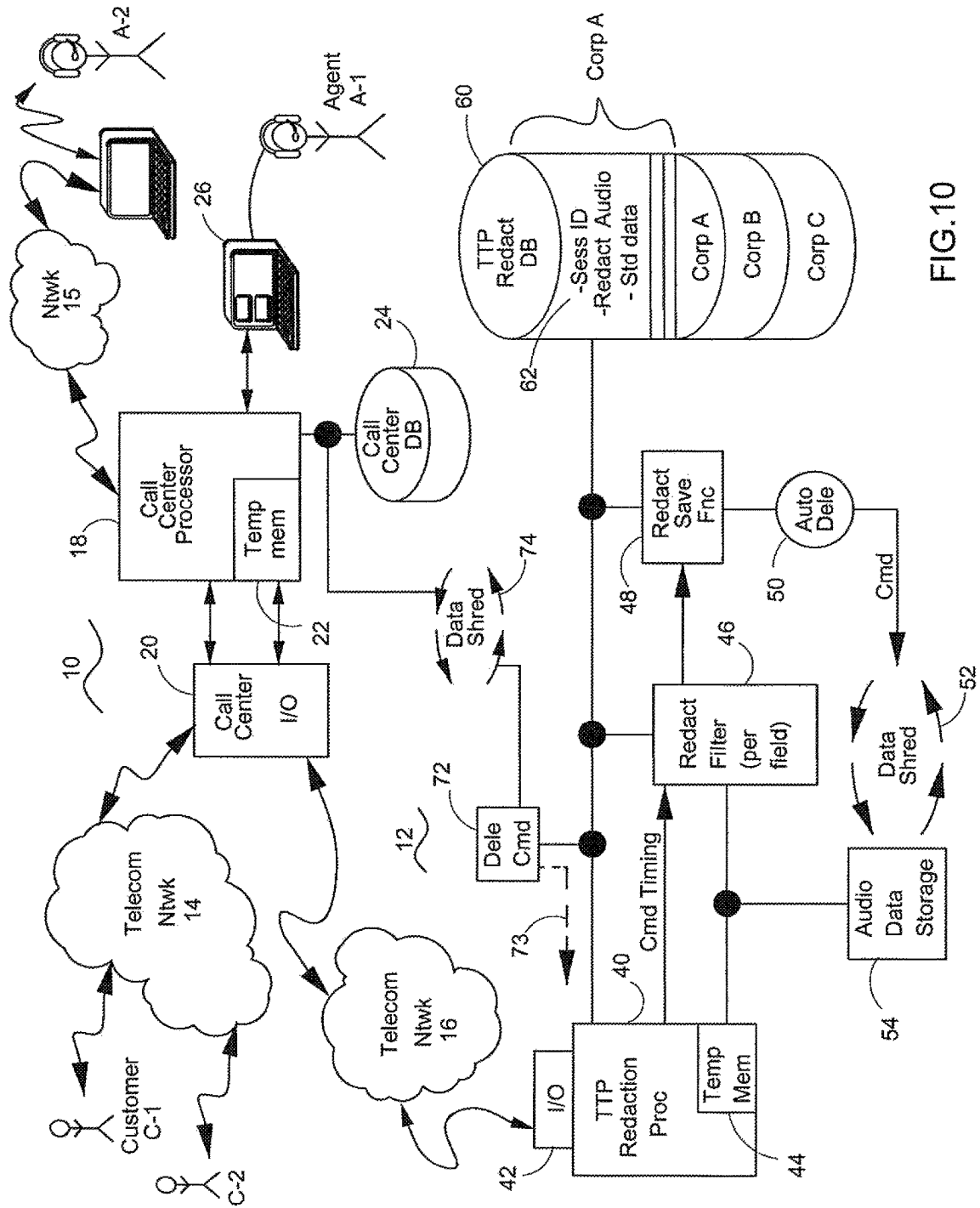
FIG. 10 diagrammatically illustrates call center 10 being geographically remote with respect to redaction center 12 and data shredding operations activated in both call-center 10 and redaction center 12 in accordance with the principles of the present invention.

FIG. 10 diagrammatical illustrates the remote system and the multiple deletion of audio data files both in call center 10 and redaction subsystem 12. Delete command function block 72 issues a "delete all audio" data command to shredding operation 74 associated with CC database 24. Preferably, crypto shredding is employed in shred function 74. However if call center 10 is geographically remote from redaction processor 40 and redaction system 12, the "delete all" command module issues the delete all command to the redact processor 40 (noted by dashed line 73) to telecom network 16 and then to CC processor 18.

Figure 11:
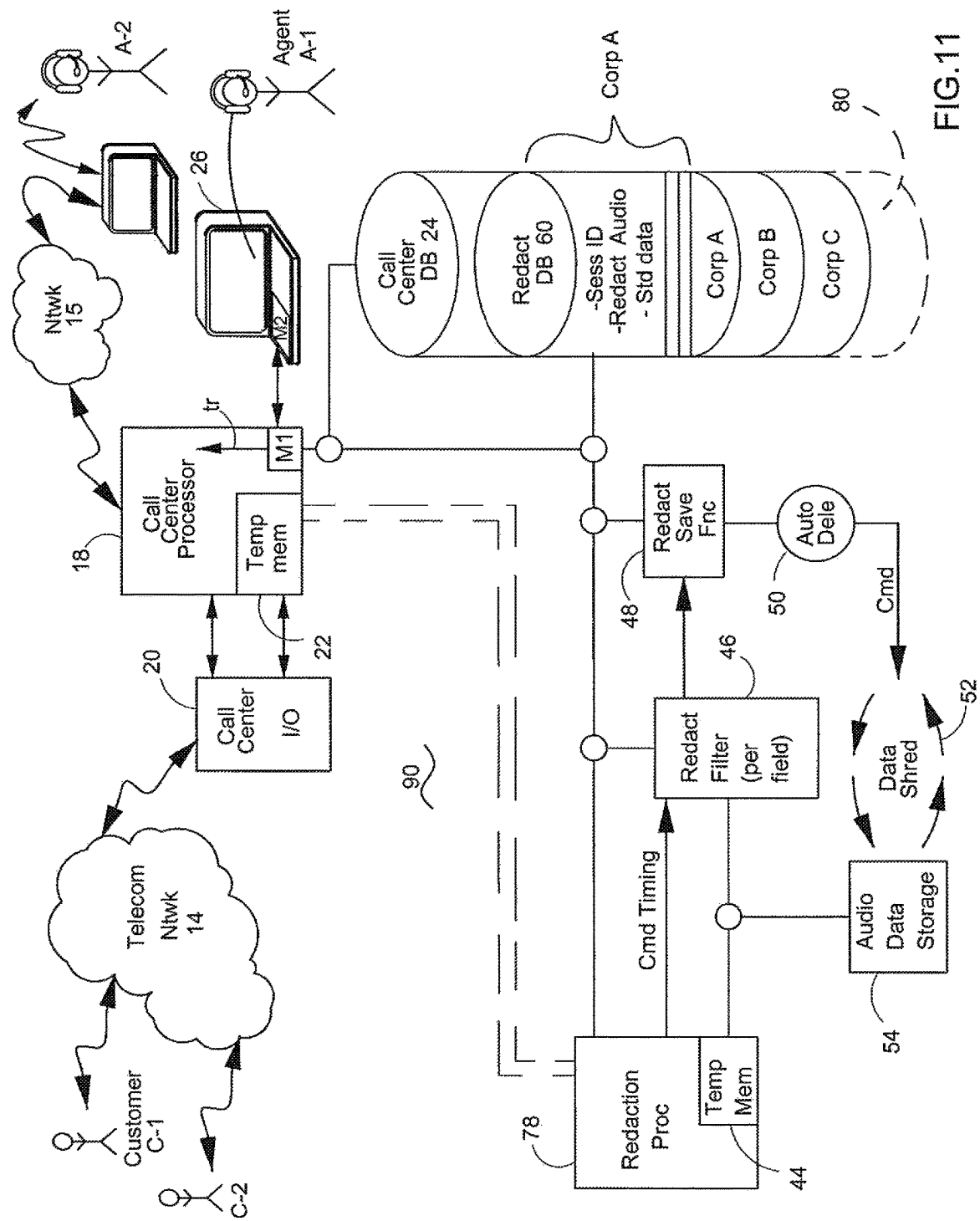
FIG. 11 diagrammatically illustrates an integrated call center system, integrated with a redaction subsystem in accordance with the principles of the present invention.

FIG. 11 diagrammatically illustrates an integrated system wherein the redaction subsystem is an integral part of the call center. Integrated system 9 has many of the same components and functional modules as described earlier. CC processor 18 includes monitor M1 which issues timing triggers TR based upon certain actions of agent A1 on terminal 26. Additionally terminal 26 may include a local monitor M2 that works in conjunction with CC monitor module M1 in CC processor 18 to generate multiple initial timing signals TR. As explained earlier, the timing signals generally represent activation in a designated data field df1 and successive or subsequent actions by the agent in another data field df2. The first trigger in the timeline for data field df1 is t-df-1. The end of file EOF for the first designated data field df1 is either some movement or keypad activity by the agent away from data field df1 or the initiation of activity in another data field df2. The second data field df2 may be a nondesignated data field or may be a designated data field. The term "designated" refers to generating a record ON timing marker for data input into the particular data field.

In the integrated system, the call center database 24 is combined with the redaction database 60 (see FIG. 1) forming a large, integrated database 76 in FIG. 11. The segmentation of database 76 into CC database 24 and redact database 60 as well as separation of campaigns and redact data records for Corp A, Corp B and Corp C still applies. In other words the operator of integrated call center 90 may still be a trusted third-party TTP providing campaign services for independent call centers B and C and in-house call center for Corp A.

Also, in connection with integrated system 90, the audio data storage 54 may be included in integrated database 76 as noted by the database extension 80 and the dashed line 82 extending between audio data storage 54 and integrated database segment 80. As stated earlier, all data storage facilities can be combined or can be separated out to provide a more efficient operation. The key elements are to identify record ON timing signals, both initially and post-acquisition, and to process those record ON timing signals to achieve better capture and permanent storage of audio data as well as to trim that audio data stored to meet business protocols. In this manner the present system provides a unique solution to an ever-expanding list of problems: how much audio recorded PII and medical and security data should be kept; for what periods of time; for what purposes; and how much highly secure data storage services must be employed over what periods of time and at what cost in order to reduce or eliminate the threat of data breaches. The automated redaction and permanent storage and permanent deletion routines herein solve those problems.

FIG. 11 generally diagrammatically illustrates a call center with a redactor. Other features of the call center with redactor are shown in the Figures. It should be noted that the call center with redactor could be deployed at a single physical location or deployed over multiple physical locations that are interconnected by a telecommunication network as a distributed computer system or may be deployed as a cloud-based computer processing system.

As discussed earlier, the agent at terminal 26 engages in a communications session with a customer via telecom network 14. The call center is coupled or connected to several communications networks. The agent has a computer with the display monitor and a user interactive input device (keyboard, keypad, mouse, touchscreen, etc.) and has a two-way audio interface with the customer. The two-way audio interface permits the agent to audibly discuss matters with the customer.

The call center has a CC processor 18 and a CC database which, in FIG. 11, is integrated database 76. In the distributed computing network (may be cloud-based computing network or a remote deployment) shown in FIG. 1, the CC database is database 24. The call center with a redactor includes an audio data store shown in FIG. 11 as audio data store 54 which may also be, in certain embodiments, integrated into integrated database 76 as data storage memory segment 80. In FIG. 1, the audio data store 54 may be included in redact database 60. See FIG. 11. The CC database has a plurality of data input forms which are generated and presented for display by processor 18 for display on the agent's computer monitor. See FIG. 2A. Those forms as shown in FIG. 1 include the form on display on monitor 28 with data fields df1, df2.

The call center with redactor includes a data input monitors M1 (in the CC processor) and potentially M2 (a thin client program) in the agent terminal which data input monitors are coupled to the CC processor 18 and are activated upon the agent's data input into one of the designated data fields, df1, df2. The call center with redactor includes a start record trigger TR which is coupled to the CC processor 18. The trigger is activated when the agent begins entering data into the designated data fields, df1, df2.

As part of the processor 18, there is a means for determining a start record time marker for the data field. Although several Figures discussed herein separate CC processor 18 from redaction processor 40, persons of ordinary skill in the art recognize that those processors can be integrated into a single processor (not shown, but see dashed connecting line in FIG. 11). Therefore, a single processor can handle these call center and redaction functions. Separation of the processors is presented herein in order to clarify the different actions and, in some embodiments, to show a distributed computing environment.

The call center with redactor includes a means for determining an end of record EOR time marker for the data field df1 and this can be done solely by CC processor 18 or may be done by redaction processor 78. The determination of the EOR and EOF algorithms for selecting the end of recording EOR and the end of file EOF signals are discussed earlier in connection with the Figures and the flowcharts.

The call center with a redactor includes a filter 46 for the stored audio data which filter generates a throughput which is ultimately throughput data which is the permanently saved audio data. The filter operates with the start record time marker, as further processed in accordance with the algorithms set forth above, and the EOR time marker (also processed as noted above). There is a "saved audio" data store which can be located in integrated database 76 or redaction database 60. Databases 76,60 permanently save the saved audio file which is generated as throughput by the filter. Also, the call center with redactor includes a crypto data shredder 52, 74 (FIG. 1 and FIG. 10).

The call center with redactor may include translator—decoder 84 (FIG. 8). As discussed earlier, CC processor 18 may be combined with redaction processor 78.

Further, CC processor 18, in conjunction with redaction processor 78, has algorithms to alter the record start time marker with added time periods. This mean to determine an addition of a predetermined precursive of time period and generating an anticipatory record start time is discussed earlier. Also the combination of CC processor 18 and redaction processor 78 includes an algorithm for adding or subtracting time periods from the EOR/EOF as a means for determining an amended or supplemental EOR time marker based upon various events such as an agent record OFF command, data input from df1 into another designated data field df2, data input from df1 into another nondesignated data field, data exceeding a field limit, data not permitted into the field (a numeric field which receives an alpha character input) and others as explained earlier. The EOR time(s) can be changed by adding (advanced) or moving forward (set to a later time) by adding to the EOR time marker (a later time) or moving the initial EOR time marker back to an earlier time.

In the drawings, and sometimes in the specification, reference is made to certain abbreviations. The following Abbreviations Table provides a correspondence between the abbreviations and the item or feature.

| Abbreviations Table | |
|---|---|
| Admin | Administrator, typically the system operator or administrator |
| addr | address - typically an address, street, city, state, zip |
| agt | agent, as in call center agent or operator |
| alt. | alternate or optional path or step, see "opt" |
| ANN | artificial neural network, sometimes an AI network, artificial intelligence network or algorithm |
| API | application program interface |
| ASP | application service provider, typically SAAS or a server on a network providing data input, output and processing services to another |
| auto | automatic, without manual activation, maybe a pre-set condition, set by the system operator, prior to use of functional program |
| AV | audio visual |
| bd | board |
| Bk | Bank or other financial institution (credit union, brokerage house, etc) |

-continued

| Abbreviations Table | |
|---|---|
| Bus. | Business, see also Corp. |
| CCU | Central Control Unit or Module |
| CD-RW | compact disk drive with read/write feature for CD disk |
| chrg | credit card charge slip or transaction record |
| cmd | command |
| Cntr | Center, as in Call Center, either at a physical location, over distributed locations or virtual cloud-based centers of operation |
| comm | communications, typically telecommunications, see also session comm |
| comp | computer, includes desk tops, laptops, tablets and smart phones with an internet enabled communications module, any computer-enabled device |
| Corp A | Company A, as compared to Company B |
| CPU | central processing unit |
| cr.cd. | credit card or debit card, and includes card no., expiry date, security code, etc. |
| cr.cd.-4 | the last 4 digits of the credit card no. |
| DB | database |
| df | data field, typically the data filed to be completed by the agent during a comm session with a customer |
| df flags | a timing marker associated with an comm session event |
| dele | delete, as in delete data, usually permanently |
| desig | designated, as in system operator "data designated to be saved" |
| disc | discount, as in discounting a credit card charge slip |
| disp | display, typically data shown on a monitor or display screen of a computer-enabled device, may be an interactive data input screen displayed to the operator/agent, or may be an output report displayed on the screen, typically display a web page or display of certain information. |
| displ | display, see above |
| doc | document |
| dry | drive, e.g., computer hard drive |
| DS | data storage |
| e | encryption |
| e.g. | for example |
| em | email |
| eof or EOF | end of data field |
| equip | equipment |
| F or f | frequency |
| fnc | function, typically a computer function |
| func | function, typically a computer function |
| h-link | hyper link to a certain webpage or landing page |
| I/O | input/output |
| id | identify or identification (such as a session id) |
| IED | Internet-enabled device, like a smart phone, tablet computer, computer, etc. |
| IP addr. | internet protocol address of internet enabled device |
| IVR | interactive voice response function |
| kypd | keypad or touch screen display acting as a keypad |
| kyBd | keyboard or a touch screen display function |
| loc | location |
| mbr | member |
| med | medical, as in medical data |
| mem | memory |
| mess | message as in SMS or text message |
| mgmt | management, typically the Call Center Operator |
| mic | microphone or audio pickup device |
| mod | module, unit or sub-system |
| ntwk | network, namely a telecomm network, typically internet based network. A local area network is also possible. |
| obj | object, for example, a data object |
| opt | optional or alternative program or module |
| pg | page, typically a web page, may be a landing web page |
| pgm | program |
| ph | phone, namely an internet enabled phone, such as a smart phone |
| ph.no. | phone number |
| PII | personal identifying data, typically a customer name, address, phone number, SSN, cr.cd. or other financial data, etc. |
| pmt | payment, as in payment processor handing cr.cd. transactions |
| proc | processor, typically a microprocessor |
| Pt. | point, as in jump point to another portion of the program |

-continued

Abbreviations Table

| | |
|---|---|
| Pty | party engaged in telecomm or internet enabled communications |
| P/W | password |
| pwr | power |
| rcd | database record or record profile |
| re | regarding or relating to |
| recon | reconstruct |
| rel | release |
| RQT | request |
| rev | review |
| Rpt | Report |
| rt | real time, may include day and time stamp data |
| sch | search |
| sec | security |
| seg | segment, as in a segment of an audio file |
| sel | select |
| sess | session, as in telecomm session between an agent and a customer |
| sig cond | signal conditioner |
| SL | security level (sometimes S1 for security level 1, etc.) |
| smart ph | smart phone coupled to the internet |
| sms | text message |
| spkr | speaker or audio announcement device |
| SSN | social security number ("no.") |
| SSN-4 | last 4 digits of social security number |
| std | standard, typically protocol set by a group and accepted by the system operator |
| stmt | statement, as in bank statement, or payment made statement |
| Svr | sever, as in web server |
| sys | system |
| Sys Op | System Operator |
| t | time |
| t-out | the expiration of a time-out clock or period, the time-out clock is started at a pre-set event start time |
| t plus tx | an additional pre-set period of time added to a time-based trigger, for example, when a time-end-flag is created, t = time-end-flag, the "t plus tx" period, when tx = 3 sec., is the time stamp at time-end-flag plus 3 sec. |
| txp | "pre" - a pre-set time period before a data field time marker, df-t plus txp, captures/saves audio prior to the df marker |
| txe | "end" - a pre-set time period after the end of a data field time marker (EOF), df-EOF-t plus tx captures/saves the df-t audio plus a pre-set time after the df-EOF marker |
| ta | a time marked triggered based upon IVR - audio transcribed and decoded "special word/phrase" located in the audio file |
| tatxe | "end" - a pre-set time period after the IVR decoded special word indicating that audio file redaction end; alternatively, the tatxe notes the next data field time marker df-t activated by the agent |
| tbl | tablet computer |
| telecom | telecommunications system or network |
| temp mem | temporary memory, RAM, etc., not permanently stored data memory or data storage units |
| TTP | Trusted Third Party system |
| tr | trigger, usually form monitors m1 or m2 |
| txr | transmitter - receiver device, maybe BLUETOOTH (tm), lan, wireless telecom network, or radio frequency |
| UPP | user or customer personal profile |
| URL | Uniform Resource Locator or other network locator |
| univ | universal application or common application |
| w/ | with |
| w/in | within |
| w/out | without |
| w/r/t | with respect to |

DESCRIPTION OF TYPICAL SYSTEM FEATURES

The system described above relates to a TTP remote processor or a local TTP processor which automatically redacts data from an audio file based upon either (a) the agent's interaction with the agent computer or computer-enabled device (e.g., when the agent moves from one data field to another data filed during a comm session with the customer) and/or (b) a time-based trimming of the audio file; or (c) an IVR function. After the redaction, the original audio file is destroyed or the TTP temporary memory is cleared of data.

The process and system may be deployed over multiple Internet-enabled devices (IED), such as, smart phone, cell phone with an APP, tablet computer, computer, or other IED device that is internet enabled. Computer tablets and other electronic devices may be configured in this manner. The APP or internet portal permits the person to access the system. If the user communicates with the system in a voice mode, the user may interact with an interactive voice response system or module, an IVR.

The present invention processes data via computer systems, over the Internet and/or on a computer network (LAN or WAN), and computer programs, computer modules and information processing systems accomplish these audio file redaction services.

It is important to know that the embodiments illustrated herein and described herein below are only examples of the many advantageous uses of the innovative teachings set forth herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawings, like numerals refer to like parts or features throughout the several views.

The present invention could be produced in hardware or software, or in a combination of hardware and software, and these implementations would be known to one of ordinary skill in the art. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in the art.

According to the inventive principles as disclosed in connection with the preferred embodiments, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer as would be known to one of ordinary skill in the art. The computer medium which may be used to hold or contain the computer program product, may be a fixture of the computer such as an embedded memory or may be on a transportable medium such as a disk, as would be known to one of ordinary skill in the art. Further, the program, or components or modules thereof, may be downloaded from the Internet of otherwise through a computer network.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, flash memory, floppy disk, disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Those of skill in the art will appreciate that the various illustrative modules, components, engines and method steps described in connection with the above described figures and embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules, components, engines, and method steps described in connection with the embodiments disclosed herein can be implemented or performed with hardware such as a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor is hardware and can be a microprocessor, but in the alternative, the processor can be any hardware processor or controller, microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm and the functionality of a component, engine, or module described in connection with the embodiments disclosed herein can be embodied directly in hardware, in software executed by a processor, or in a combination of the two. Software can reside in computer or controller accessible computer-readable storage media including RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

What is claimed is:

1. A redaction process for a captured audio file, deployed in combination with a call center wherein the call center includes a call center ("CC") processor, a CC database and one or more CC interfaces for one or more communications networks, said CC processor handling calls between a plurality of customers and a plurality of call center agents, a corresponding agent in communication with a respective customer via one or more networks coupled to said CC processor via said one or more CC interfaces wherein a unique communication session between a respective customer and agent includes voice-based audio data, the redaction process comprising:
    storing, at least on a temporary basis, said audio data;
    monitoring data input from said agent into one or more predefined data fields, said data fields associated with said CC database and the input processed by said CC processor;
    generating a start-record time marker based upon an initial data input by said agent into one data field of said one or more predefined data fields and generating an end-of-recording ("EOR") time marker for said data field;
    filtering the stored audio data and permanently saving audio data within the start-record time marker and the EOR time marker;
    deleting all stored audio data except for the permanently saved audio data in a manner that substantially eliminates retrieval of said stored audio data;
    further deleting all stored audio data in the CC database except for the permanently saved audio data; and
    a crypto data shredder which crypto shreds the stored audio data which eliminates retrieval of the stored audio data.

2. The redaction process operative in combination with said call center as claimed in claim 1 wherein said call center is a cloud computing operation,
    said CC database stores on a temporary basis said audio data; and
    the redaction process deletes all stored audio data in the CC database except for the permanently saved audio data;
    the redaction process includes associating said permanently saved audio data with communication ("comm") session data for the respective customer-agent communication session.

3. The redaction process operative in combination with said call center as claimed in claim 2 including:
    after generating said start-record time marker and prior to filtering the stored audio data, adding a predetermined precursive time period to said start-record time marker resulting in an anticipatory start-record time marker;
    filtering the stored audio data based upon said anticipatory start-record time marker and said EOR time marker.

4. The redaction process operative in combination with said call center as claimed in claim 2 wherein said initial data input by said agent is input into a designated data field, the redaction process including:
generating said EOR based upon one or more of:
data input into said designated data field exceeding a data field limit;
further data input by said agent into another data field other than said designated data field;
an agent keyed input from a group of keyed inputs including an enter key, a tab key, a page-up key, a page-down key, an alpha key, a numeric key, and a predetermined command keyset, said agent keyed input associated with either keyboard responses detected by said CC processor, touch screen responses detected by said CC processor, or cursor-directed responses detected by said CC processor.

5. The redaction process operative in combination with said call center as claimed in claim 4 including:
after generating said start-record time marker and prior to filtering the stored audio data, either (i) adding a predetermined precursive time period to said start-record time marker resulting in an anticipatory start-record time marker; or (ii) adding a predetermined successive time period to said start-record time marker resulting in an successive start-record time marker;
after generating said EOR and prior to filtering the stored audio data, either (a) adding a predetermined precursive time period to said EOR time period resulting in a supplemental EOR time marker which overrides said EOR time marker; (b) adding a predetermined successive EOR time period to said EOR resulting in a supplemental EOR time marker which overrides said EOR time marker;
filtering the stored audio data based upon one or more of said anticipatory start-record time marker, successive start-record time marker, and said supplemental EOR time marker.

6. The redaction process operative in combination with said call center as claimed in claim 1:
wherein said CC processor and said CC database is remotely disposed over the Internet at a geographically remote location from said redaction process;
wherein storing said audio data, at least on said temporary basis, occurs in said CC database;
wherein monitoring data input from said agent occurs in connection with said CC processor;
for said redaction process:
providing a redaction processor which is associated with a redaction database and a redaction interface which redaction processor and redaction interface communicates with said one or more communications networks;
establishing communication between said redaction processor and said CC processor via their respective interfaces;
said redaction processor and redaction database accepting said stored audio data from said CC processor;
after accepting, filtering said stored audio data;
said permanently saved audio data being stored in said redaction database along with comm session data for the respective customer-agent communication session;
issuing a delete-audio-file instruction to said CC processor to delete all stored audio data in said manner that substantially eliminates retrieval; and
uploading to said CC processor said permanently saved audio data from said redaction database.

7. The redaction process operative in combination with said call center as claimed in claim 1 wherein the redaction process includes:
storing said audio data, at least on said temporary basis, in said CC database;
said CC processor generating said start-record time marker based upon said initial data input by said agent into said data field and generating said end-of-recording ("EOR") time marker for said data field;
said CC processor filtering said stored audio data and permanently saving audio data in said CC database as redacted saved audio data with comm session data; and
said CC processor deleting all stored audio data from said CC database by crypto-shredding except for said redacted saved audio data.

8. The redaction process operative in combination with said call center as claimed in claim 7 including:
after generating said start-record time marker and prior to filtering the stored audio data, adding a predetermined precursive time period to said start-record time marker resulting in an anticipatory start-record time marker;
filtering the stored audio data based upon said anticipatory start-record time marker and said EOR time marker.

9. The redaction process operative in combination with said call center as claimed in claim 7 wherein said initial data input by said agent is input into a designated data field, the redaction process including:
generating said EOR based upon one or more of:
data input into said designated data field exceeding a data field limit;
further data input by said agent into another data field other than said designated data field;
an agent keyed input from a group of keyed inputs including an enter key, a tab key, a page-up key, a page-down key, an alpha key, a numeric key, and a predetermined command keyset, said agent keyed input associated with either keyboard responses detected by said CC processor, touch screen responses detected by said CC processor, or cursor-directed responses detected by said CC processor.

10. The redaction process operative in combination with said call center as claimed in claim 1 including:
after generating said start-record time marker and prior to filtering the stored audio data, adding a predetermined precursive time period to said start-record time marker resulting in an anticipatory start-record time marker;
filtering the stored audio data based upon said anticipatory start-record time marker and said EOR time marker.

11. The redaction process operative in combination with said call center as claimed in claim 10 wherein after obtaining the anticipatory start-record time marker and the EOR time marker, trimming the to-be-permanently-saved audio data by either moving the EOR time marker back in time by a predetermined trim time period, moving the EOR time marker back in time by a predetermined trim-start time period wherein the EOR is correlated to the anticipatory start-record time marker, or advancing the EOR time marker a predetermined advance time period.

12. The redaction process operative in combination with said call center as claimed in claim 1 wherein said initial data input by said agent is input into a designated data field, the redaction process including:
generating said EOR based upon one or more of:
data input into said designated data field exceeding a data field limit;
further data input by said agent into another data field other than said designated data field;

an agent keyed input from a group of keyed inputs including an enter key, a tab key, a page-up key, a page-down key, an alpha key, a numeric key, and a predetermined command keyset, said agent keyed input associated with either keyboard responses detected by said CC processor, touch screen responses detected by said CC processor, or cursor-directed responses detected by said CC processor.

13. The redaction process operative in combination with said call center as claimed in claim 12 wherein after obtaining the anticipatory start-record time marker and the EOR time marker, trimming the to-be-permanently-saved audio data by either moving the EOR time marker back in time by a predetermined trim time period, moving the EOR time marker back in time by a predetermined trim-start time period wherein the EOR is correlated to the anticipatory start-record time marker, or advancing the EOR time marker a predetermined advance time period.

14. The redaction process operative in combination with said call center as claimed in claim 12 including:
after generating said start-record time marker and prior to filtering the stored audio data, adding a predetermined precursive time period to said start-record time marker resulting in an anticipatory start-record time marker;
after generating said EOR and prior to filtering the stored audio data, adding a predetermined precursive EOR time period to said EOR resulting in an anticipatory EOR time marker;
filtering the stored audio data based upon said anticipatory start-record time marker and said anticipatory EOR time marker.

15. The redaction process operative in combination with said call center as claimed in claim 12 including:
after generating said start-record time marker and prior to filtering the stored audio data, either (i) adding a predetermined precursive time period to said start-record time marker resulting in an anticipatory start-record time marker; or (ii) adding a predetermined successive time period to said start-record time marker resulting in an successive start-record time marker;
after generating said EOR and prior to filtering the stored audio data, either (a) adding a predetermined precursive time period to said EOR time period resulting in a supplemental EOR time marker which overrides said EOR time marker; (b) adding a predetermined successive EOR time period to said EOR resulting in a supplemental EOR time marker which overrides said EOR time marker;
filtering the stored audio data based upon one or more of said anticipatory start-record time marker, successive start-record time marker, and said supplemental EOR time marker.

16. The redaction process operative in combination with said call center as claimed in claim 1 wherein:
wherein said data field is an interactive data field;
providing an interactive voice response data field for said redaction process;
activating said interactive voice response data field and thereafter generating said start-record time marker for said interactive data field.

17. The redaction process operative in combination with said call center as claimed in claim 1 including:
providing an interactive voice response data field for said redaction process.

18. The redaction process operative in combination with said call center as claimed in claim 17 including:

after generating said start-record time marker and prior to filtering the stored audio data, adding a predetermined precursive time period to said start-record time marker resulting in an anticipatory start-record time marker;
filtering the stored audio data based upon said anticipatory start-record time marker and said EOR time marker.

19. The redaction process operative in combination with said call center as claimed in claim 18 wherein said initial data input by said agent is input into a designated data field, the redaction process including:
generating said EOR based upon one or more of:
an agent record-off command;
data input into said designated data field exceeding a data field limit;
further data input by said agent into another data field other than said designated data field;
an agent keyed input from a group of keyed inputs including an enter key, a tab key, a page-up key, a page-down key, an alpha key, a numeric key, and a predetermined command keyset, said agent keyed input associated with either keyboard responses detected by said CC processor, touch screen responses detected by said CC processor, or cursor-directed responses detected by said CC processor.

20. The redaction process operative in combination with said call center as claimed in claim 19 including generating said EOR based upon said interactive voice response data field activity.

21. The redaction process operative in combination with said call center as claimed in claim 20 including an interactive end-of-file (EOF) data field action.

22. A redaction process for a captured audio file, deployed in combination with a cloud-based call center wherein the call center includes a cloud-based call center ("CC") processor and a cloud-based CC database and interfaces for communications between a plurality of customers and a plurality of call center agents connected to the call center, wherein the call center handles at least one unique communication ("comm") session between a respective customer and agent which comm session includes voice-based audio data, the redaction process comprising:
storing, at least on a temporary basis in said CC database, said audio data;
monitoring data input from said agent into one or more predefined data fields, said data fields associated with said CC database and the input processed by said CC processor;
generating a start-record time marker based upon an initial data input by said agent into one data field of said one or more predefined data fields and generating a end-of-recording ("EOR") time marker for said data field;
filtering the stored audio data and permanently saving audio data within the start-record time marker and the EOR time marker in said CC database as part of a comm session data record;
deleting all stored audio data except for the permanently saved audio data in a manner that substantially eliminates retrieval of said stored audio data;
further deleting all stored audio data in the CC database except for the permanently saved audio data; and
a crypto data shredder which crypto shreds the stored audio data which eliminates retrieval of the stored audio data.

23. A call center with a redactor for redacting a captured audio file associated with a unique communication session between a respective customer and a corresponding call center agent which audio file includes voice-based audio data, said call center coupled to one or more communications networks carrying said unique communication session, said agent having a computer with a display monitor and an user-interactive input device and a two-way audio interface, said agent computer coupled to said one or more communications networks carrying said unique communication session, said call center comprising:

a call center ("CC") processor coupled to a CC database and further coupled to one or more CC interfaces for said one or more communications networks, said agent and said customer coupled to said CC processor via said one or more CC interfaces carrying said unique agent-customer communication session;

an audio data store for said audio data associated with said CC database, which stores, at least on a temporary basis, said voice-based audio data under the control of said CC processor coupled to said audio data store;

said CC database having a plurality of data input forms which are generated for display on said agent's computer monitor, at least one data input form having a designated data field;

a data input monitor coupled to said CC processor activated upon said agent's data input into said designated data field on said one data input form displayed on said agent's computer monitor;

a start-record trigger coupled to said CC processor and said data input monitor activated upon said agent's data input into said designated data field, said start-record trigger generating a start-record time marker which is associated with the stored audio data;

as part of said CC processor, means for determining an end-of-recording ("EOR") time marker for said data field, said EOR associated with the stored audio data;

coupled to said CC processor, a filter for the stored audio data which generates as a throughput to-be permanently saved audio data within the start-record time marker and the EOR time marker;

a saved audio data store for said permanently saved audio data receiving the filter throughput; and a crypto data shredder which crypto shreds said stored audio data form said CC database.

24. A call center with a redactor as claimed in claim 23 including:

an interactive voice response data field coupled to said CC processor;

said CC processor having means for generating said start-record time marker based upon action in said interactive voice response data field.

25. A call center with a redactor as claimed in claim 23 including means for adding a predetermined precursive time period to said start-record time marker resulting in an anticipatory start-record time marker, said anticipatory start-record time marker applied to said filter;

said filter generating throughput as to-be permanently saved audio data based upon said anticipatory start-record time marker and said EOR time marker.

26. The redaction process operative in combination with said call center as claimed in claim 25 including:

after generating said start-record time marker and prior to filtering the stored audio data, either (i) adding a predetermined precursive time period to said start-record time marker resulting in an anticipatory start-record time marker; or (ii) adding a predetermined successive time period to said start-record time marker resulting in an successive start-record time marker;

after generating said EOR and prior to filtering the stored audio data, either (a) adding a predetermined precursive time period to said EOR time period resulting in a supplemental EOR time marker which overrides said EOR time marker; (b) adding a predetermined successive EOR time period to said EOR resulting in a supplemental EOR time marker which overrides said EOR time marker;

filtering the stored audio data based upon one or more of said anticipatory start-record time marker, successive start-record time marker, and said supplemental EOR time marker.

27. A call center with a redactor as claimed in claim 25 wherein said means for determining said EOR time marker includes generating said EOR time marker based upon one or more of:

an agent record-off command;

data input into said designated data field exceeding a data field limit;

further data input by said agent into another data field other than said designated data field;

an agent keyed input from a group of keyed inputs including an enter key, a tab key, a page-up key, a page-down key, an alpha key, a numeric key, and a predetermined command keyset, said agent keyed input associated with either keyboard responses detected by said CC processor, touch screen responses detected by said CC processor, or cursor-directed responses detected by said CC processor.

* * * * *